(12) United States Patent
Huitema

(10) Patent No.: US 10,261,634 B2
(45) Date of Patent: Apr. 16, 2019

(54) INFRARED TOUCH SYSTEM FOR FLEXIBLE DISPLAYS

(71) Applicant: FLEXTERRA, INC., Skokie, IL (US)

(72) Inventor: Hjalmar Edzer Ayco Huitema, Belmont, CA (US)

(73) Assignee: FLEXTERRA, INC., Skokie, IL (US)

( * ) Notice: Subject to any disclaimer, the term of this patent is extended or adjusted under 35 U.S.C. 154(b) by 50 days.

(21) Appl. No.: 15/295,996

(22) Filed: Oct. 17, 2016

(65) Prior Publication Data

US 2017/0131846 A1 May 11, 2017

Related U.S. Application Data

(63) Continuation of application No. PCT/US2015/026163, filed on Apr. 16, 2015.

(60) Provisional application No. 61/981,132, filed on Apr. 17, 2014.

(51) Int. Cl.
*G06F 3/042* (2006.01)

(52) U.S. Cl.
CPC .. *G06F 3/0421* (2013.01); *G06F 2203/04102* (2013.01)

(58) Field of Classification Search
CPC .................... G06F 3/0421; G06F 2203/04102
See application file for complete search history.

(56) References Cited

U.S. PATENT DOCUMENTS

| 4,937,444 A | * | 6/1990 | Zimmerman | A61B 5/1126 250/221 |
|---|---|---|---|---|
| 5,097,252 A | * | 3/1992 | Harvill | A61B 5/1126 200/DIG. 2 |
| 5,707,745 A | | 1/1998 | Forrest et al. | |
| 5,844,363 A | | 12/1998 | Gu et al. | |
| 5,930,026 A | | 7/1999 | Jacobson et al. | |
| 6,097,147 A | | 8/2000 | Baldo et al. | |
| 6,303,238 B1 | | 10/2001 | Thompson et al. | |
| 6,585,914 B2 | | 7/2003 | Marks et al. | |

(Continued)

FOREIGN PATENT DOCUMENTS

WO WO-2015/100404 A1 7/2015

OTHER PUBLICATIONS

International Search Report and Written Opinion for Application No. PCT/US2015/026163, dated Jul. 20, 2015.

(Continued)

*Primary Examiner* — Christopher E Leiby
(74) *Attorney, Agent, or Firm* — Marshall, Gerstein & Borun LLP

(57) ABSTRACT

A touch interface includes a plurality of emitters arranged along a first edge of a flexible electronics component to emit light that propagates across a surface of the flexible electronics component and a plurality of receivers arranged along a second edge of the flexible electronics component to detect light. The touch interface further includes a touch controller coupled to the plurality of emitters and the plurality of receivers. The touch controller is configured to cause one or more of the plurality of emitters to emit light, receive one or more signals indicative of detected light at the plurality of receivers, and determine at least one of a user interaction with the flexible electronics component or a current state of flexing of the flexible electronics component.

19 Claims, 15 Drawing Sheets

(56) References Cited

U.S. PATENT DOCUMENTS

| | | | |
|---|---|---|---|
| 6,608,323 B2 | 8/2003 | Marks et al. | |
| 6,831,769 B2 | 12/2004 | Holman et al. | |
| 6,839,158 B2 | 1/2005 | Albert et al. | |
| 6,991,749 B2 | 1/2006 | Marks et al. | |
| 7,170,670 B2 | 1/2007 | Webber | |
| 7,374,702 B2 | 5/2008 | Marks et al. | |
| 7,446,945 B2 | 11/2008 | Kuiper et al. | |
| 7,528,176 B2 | 5/2009 | Marks et al. | |
| 7,569,693 B2 | 8/2009 | Marks et al. | |
| 7,605,225 B2 | 10/2009 | Marks et al. | |
| 7,605,394 B2 | 10/2009 | Marks et al. | |
| 7,630,591 B2* | 12/2009 | Allen | D03D 15/00 250/227.11 |
| 7,671,202 B2 | 3/2010 | Marks et al. | |
| 7,816,480 B2 | 10/2010 | Marks et al. | |
| 7,842,198 B2 | 11/2010 | Marks et al. | |
| 7,892,454 B2 | 2/2011 | Facchetti et al. | |
| 7,893,265 B2 | 2/2011 | Facchetti et al. | |
| 7,902,363 B2 | 3/2011 | Facchetti et al. | |
| 7,947,837 B2 | 5/2011 | Marks et al. | |
| 7,981,989 B2 | 7/2011 | Yan et al. | |
| 7,982,039 B2 | 7/2011 | Marks et al. | |
| 8,017,458 B2 | 9/2011 | Marks et al. | |
| 8,022,214 B2 | 9/2011 | Facchetti et al. | |
| 8,093,588 B2 | 1/2012 | Marks et al. | |
| 8,097,877 B2 | 1/2012 | Marks et al. | |
| 8,111,465 B2 | 2/2012 | Heikenfeld et al. | |
| 8,274,075 B2 | 9/2012 | Marks et al. | |
| 8,329,855 B2 | 12/2012 | Usta et al. | |
| 8,334,545 B2 | 12/2012 | Levermore et al. | |
| 8,338,555 B2 | 12/2012 | Yan et al. | |
| 8,395,150 B2 | 3/2013 | Marks et al. | |
| 8,404,844 B2 | 3/2013 | Kastler et al. | |
| 8,440,828 B2 | 5/2013 | Quinn et al. | |
| 8,515,128 B1* | 8/2013 | Hildreth | G06F 3/017 345/156 |
| 9,120,290 B2* | 9/2015 | Krall | B32B 3/28 |
| 9,588,582 B2* | 3/2017 | Connor | A61B 5/1126 |
| 9,848,494 B2* | 12/2017 | Huitema | G06F 1/163 |
| 2007/0279852 A1* | 12/2007 | Daniel | A44C 5/0007 361/679.03 |
| 2009/0122007 A1 | 5/2009 | Tsuzaki et al. | |
| 2009/0189878 A1 | 7/2009 | Goertz et al. | |
| 2009/0219225 A1* | 9/2009 | Cope | G09F 9/30 345/55 |
| 2010/0252112 A1 | 10/2010 | Watson | |
| 2010/0283047 A1 | 11/2010 | Facchetti et al. | |
| 2010/0326527 A1 | 12/2010 | Facchetti et al. | |
| 2011/0120558 A1 | 5/2011 | Facchetti et al. | |
| 2011/0136333 A1 | 6/2011 | Facchetti et al. | |
| 2011/0175089 A1 | 7/2011 | Zheng et al. | |
| 2011/0181552 A1* | 7/2011 | Goertz | G06F 3/042 345/175 |
| 2011/0215334 A1 | 9/2011 | Quinn et al. | |
| 2011/0292049 A1* | 12/2011 | Muravsky | G06F 3/014 345/440 |
| 2012/0068314 A1 | 3/2012 | Kastler et al. | |
| 2012/0182755 A1* | 7/2012 | Wildner | G09F 9/301 362/555 |
| 2012/0194478 A1 | 8/2012 | Liu et al. | |
| 2012/0223314 A1 | 9/2012 | Marks et al. | |
| 2013/0044215 A1* | 2/2013 | Rothkopf | G06F 1/163 348/143 |
| 2013/0062598 A1 | 3/2013 | Usta et al. | |
| 2013/0120106 A1* | 5/2013 | Cauwels | G06F 1/163 340/3.1 |
| 2013/0127765 A1* | 5/2013 | Behdasht | G06F 3/041 345/173 |
| 2013/0181896 A1* | 7/2013 | Gruhlke | G06F 3/017 345/156 |
| 2013/0229373 A1 | 9/2013 | Eriksson et al. | |
| 2014/0062892 A1* | 3/2014 | Dickinson | G06F 3/0412 345/173 |
| 2014/0278229 A1* | 9/2014 | Hong | A63B 71/06 702/160 |
| 2014/0320431 A1* | 10/2014 | Cruz-Hernandez | G06F 3/041 345/173 |
| 2015/0089974 A1* | 4/2015 | Seo | A44C 5/0076 63/1.13 |
| 2015/0185944 A1* | 7/2015 | Magi | G06F 1/1652 345/174 |
| 2015/0227173 A1* | 8/2015 | Hwang | G06F 1/1652 345/619 |
| 2016/0299526 A1* | 10/2016 | Inagaki | G02F 1/133305 |

OTHER PUBLICATIONS

International Preliminary Report on Patentability for Application No. PCT/US2015/026163, dated Oct. 18, 2016.

* cited by examiner

INFRARED TOUCH SYSTEM FOR FLEXIBLE DISPLAYS

CROSS-REFERENCE TO RELATED APPLICATIONS

This application is a continuation of International Application No. PCT/US2015/026163 filed Apr. 16, 2015, which claims priority to and the benefit of the filing date of U.S. Provisional Patent Application Ser. No. 61/981,132, which was entitled "Infrared Touch System for Flexible Displays" and filed on Apr. 17, 2014. The entire disclosure of each of these applications is hereby expressly incorporated by reference herein for all uses and purposes.

Further, this application is related to commonly-owned International Application PCT/US14/72328, entitled "SUPPORT STRUCTURES FOR A FLEXIBLE ELECTRONIC COMPONENT," filed Dec. 24, 2014, the entire disclosure of which is hereby incorporated by reference herein. This application is also related to commonly-owned U.S. Provisional Patent Application No. 61/971,100, filed Mar. 27, 2014, entitled "OPTIMAL MOUNTING OF A FLEXIBLE DISPLAY," the entire disclosure of which is hereby incorporated by reference herein.

TECHNICAL FIELD

This patent application relates generally to touch interfaces for electronic devices, and more particularly, to touchscreen interfaces for flexible electronic displays.

BACKGROUND

Touchscreen interfaces of mobile devices, such as phones, e-readers, tablet computers, etc., commonly implement touch interactivity by adding a system of infrared light emitters and receivers around a display. The emitters and detectors are incorporated in a bezel of the device that either creates an infrared field just above the surface of the display or creates an infrared field in a top substrate of the display. Any object that blocks the light above the surface or frustrates the total internal reflection in the top substrate is detected by the receivers and interpreted, by a controller, as a touch event.

Despite the varied applications of infrared touchscreen in phones, e-readers, etc., currently existing infrared touchscreens are not compatible with flexible electronic displays. Further, other touch detection systems, such as resistive, surface capacitive, or projected capacitive systems, may be theoretically implemented in a flexible application, but such systems are impractical for real flexible product applications due a requirement to add additional layers to a display. Additional layers reduce the inherent flexibility of a display and may not allow a flexible electronic display to meet product requirements, not to mention that the additional layers reduce optical performance of a display.

SUMMARY

In an embodiment, a touch interface comprises a plurality of emitters arranged along a first edge of a flexible electronics component to emit light that propagates across a surface of the flexible electronics component, and a plurality of receivers arranged along a second edge of the flexible electronics component to detect light. The touch interface further comprises a touch controller coupled to the plurality of emitters and the plurality of receivers, the touch controller configured to: cause one or more of the plurality of emitters to emit light, receive, from the plurality of receivers, one or more signals indicative of detected light at the plurality of receivers, and determine at least one of a user interaction with the flexible electronics component or a current state of flexing of the flexible electronics component based on the one or more signals indicative of light detected at the plurality of receivers.

In another embodiment, a flexible electronics assembly comprises a flexible electronics component, a support structure component adhered to the flexible electronics component, and a touch interface. The touch interface includes a plurality of emitters mounted to the support structure component and arranged along a first edge of the flexible electronics component to emit light that propagates across a surface of the flexible electronics component, and a plurality of receivers mounted to the support structure component and arranged along a second edge of the flexible electronics component to detect light. The touch interface further includes a touch controller coupled to the plurality of emitters and the plurality of receivers, the touch controller configured to: cause one or more of the plurality of emitters to emit light, receive, from the plurality of receivers, one or more signals indicative of detected light at the plurality of receivers, and determine at least one of a user interaction with the flexible electronics component or a current state of flexing of the flexible electronics component based on the one or more signals indicative of light detected at the plurality of receivers.

DETAILED DESCRIPTION

A touch interface provides user interactivity with a flexible electronics component, such as a flexible electronic display. The touch interface includes a plurality of emitters on one side or edge of the flexible electronics component and a plurality of receivers along another side of the flexible electronics components. When light is emitted from one or more of the plurality of emitters, one or more of the plurality of receivers may receive the emitted light, receive scattered light, or receive little or no light (e.g., when the light is blocked by a touch on the surface of the flexible electronics component). A touch controller may determine, based on output of the plurality of receivers indicative of received light, a user interaction, such as a touch, squeeze, drag gesture, etc., or may determine a state of flexing of the flexible electronics component, such as bend/not-bent, overlapping, local bending, etc.

A wearable computing or communication device or wearable article, such as a smartwatch, may integrate the touch interface, such that the touch interface is dynamically bendable or conformable to a user's wrist, arm, or other curved or flat surface. For example, a flexible wristband or smartwatch integrating the touch interface along with a flexible display component may display and allow a user to interact with (via the touch interface) images, data, maps, calendars, social media information, etc., while maintaining flexibility of the wristband to relatively high bending radii (with respect to a flat state). Devices integrating the touch interface may also be easily attached to other items, such as mugs, cups, computers, phone covers, bike handles, automobile dashboards, stands, etc.

Generally, it is understood that touch interfaces or systems, or touchscreen interfaces or systems, discussed herein may be integrated into any type of wearable or non-wearable computing, communication, or other mobile device and, in some cases, may be utilized as standalone interfaces communicatively connected to an external computing or communication device. Further, although touchscreen interfaces for interaction with flexible displays are given as examples throughout this description, it is understood that flexible touch interfaces may be physically or electronically coupled to or provide interaction with any suitable combination of flexible electronics components or devices without flexible displays, such as laptop/tablet/desktop computers, portable media players, video game controllers, health or activity monitoring devices, cameras, geographic positioning systems, vehicle cabin controls, utility or appliance controls, musical instrument control surfaces, etc. In cases when the flexible electronics component is a flexible display, the flexible display may be a flexible electrophoretic display (EPD), a flexible Light Emitting Diode (LEDs) display, a flexible electrowetting display, or a flexible LCD.

System Overview

Figure 1A:
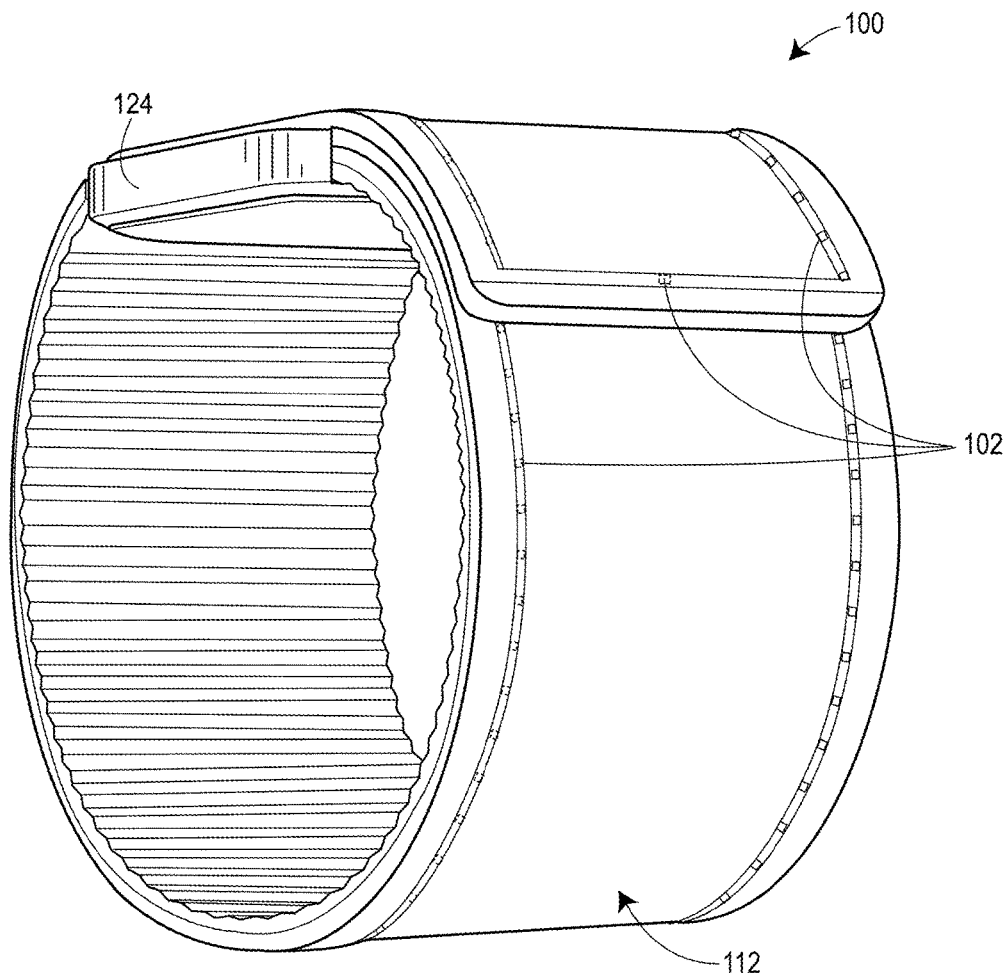
FIG. 1A is a perspective view of an example article in which a touch interface for a flexible electronics component may be integrated.
Figure 1B:
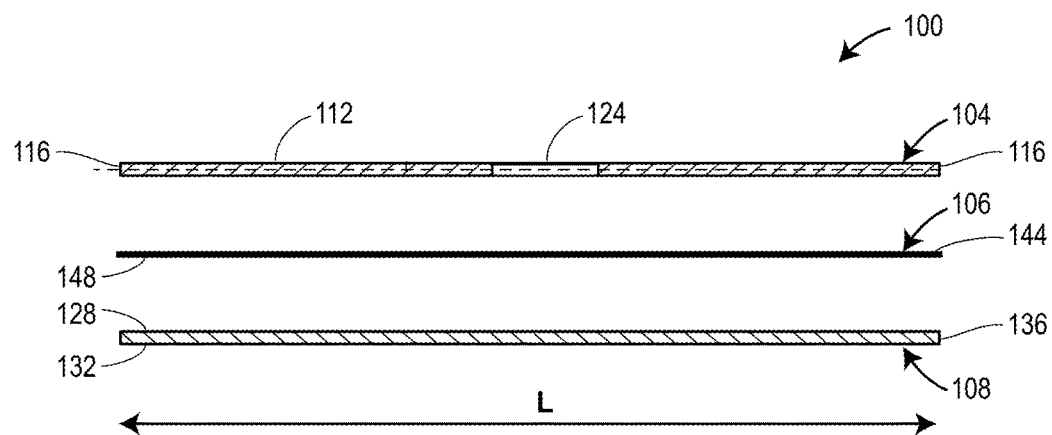
FIG. 1B is an exploded view of the layers of the example article generally depicted in FIG. 1A.

FIGS. 1A and 1B illustrate an example flexible, attachable article 100, such as a smartwatch or bracelet type computing or communication device, integrating an example touch interface 102. The article may include the touch interface 102 (or touchscreen interface) to allow a user to interact with a flexible electronics component, or an example flexible display component 104, by touching a surface 112, where the surface 112 is at or near a top surface of the flexible display component 104.

As illustrated in an expanded view of the layers of the article 100 in FIG. 1B, the article 100 may also include the flexible display component, an interlayer 106 and a support structure component 108, further details of which are described in International Application PCT/US14/72328.

In some implementations, the touch interface 102 includes a plurality of emitters of light and a plurality of receivers of light arranged along one or more edges of the flexible display component 104. The plurality of emitters may, when operated, emit light that propagates across the surface 112 of the article 100, and the plurality of receivers may be positioned opposite of one or more of the plurality of emitters so as to receive the emitted light at least in some scenarios (e.g., when the article is in a "flat state," globally bent, or locally bent, as further discussed below). When an operator or other object touches the surface 112, the plurality of receivers may detect a blocking or scattering of light and, thus, be configured to transmit electrical signals indicative of the touch event to a touch controller, as discussed further with respect to FIG. 2.

The emitters of the touch interface 102 may emit infrared light, in some implementations. For example, the emitters of the touch interface 102 may include a plurality of infrared light-emitting diodes (LEDs). Generally, however, the emitters of the touch interface 102 may include any suitable sources of light, such as lasers, incandescent bulbs, etc. The receivers of the touch interface 102 may include photo diodes or other light detectors capable of producing signals (e.g., voltage or current) indicative of or proportional to amounts (e.g., intensities) of light received.

The touch interface 102 and the flexible display component 104 are dynamically bendable or conformable to a surface, object, or device, though in other embodiments the flexible display component can be a collapsible e-reader, roll-out screen, OLED light, or other electronic component. The flexible display component 104 can be manufactured as any type of flexible display, such as an e-paper display, an organic light-emitting diode (OLED) display, etc., further details of which are discussed with reference to FIG. 2 and described in commonly owned U.S. Provisional Patent Application 61/920,705, filed Dec. 24, 2013 and entitled "DYNAMICALLY FLEXIBLE, ATTACHABLE DEVICE HAVING AN INTEGRAL FLEXIBLE DISPLAY," the disclosure of which is hereby expressly incorporated by reference herein.

Once manufactured, the touch interface 102 and the flexible display component 104 may be configured for flexing, curving, or bending in an inward direction (i.e., the flexible display component 104 has a convex shape) and/or outward direction (i.e., the flexible display component 104 has a concave shape).

The device 100 also includes an electronics module 124 that is disposed between one or more ends 116 of the flexible display component 104 and holds electronics, such as processors, memories, sensors, batteries, display drivers, etc. that are used to power and drive the touch interface 102 and the flexible display component 104 and to provide other communication functionality for the device 100. It will be appreciated that the electronics module 124 can be positioned elsewhere in other examples, such as, for example, disposed on the flexible display component 104. If desired, the components of the electronics module 124 can be sealed or otherwise protected from water, air, dirt, etc. to which the exterior of the device 100 is exposed. For example, any or all of these electronic components may be encapsulated in a hermetically sealed manner to prevent any direct exposure of these components to exterior forces and environmental hazards. Further details of an example electronics module are included with reference to FIG. 2.

To prevent the flexible display component 104 from being bent or curved beyond its minimum bending radius and, in some implementations, to mount the touch interface 102, the article 100 includes the support structure component 108, which is coupled to the flexible display component 104. The support structure component 108 is configured to limit local bending of the flexible display component 104 beyond one or more flexibility constraints, such as a minimum bending radius, while still meeting flexibility requirements of the article 100. The support structure component 108 can limit local bending of the flexible display component 104 in one direction (e.g., an inward or an outward direction) or in both directions (i.e., an inward and outward direction). The support structure component 108 may be similar, in form and/or functionality, to any of the example support structure components described in commonly owned U.S. Provisional Patent Application 61/946,412, filed Feb. 28, 2014, and entitled "SUPPORT STRUCTURE FOR A FLEXIBLE DISPLAY COMPONENT." Further, the support structure component 108, the interlayer 106, and the flexible display component 104 may be assembled, or adhered together, to form the device 100 using some or all of the mounting techniques described in commonly owned U.S. Provisional Patent Application 61/971,100, filed March 27 and entitled "OPTIMAL MOUNTING OF A FLEXIBLE DISPLAY," the disclosure of which is hereby expressly incorporated by reference herein.

As shown in FIG. 1B, the support structure component 108 has a top side 128, a bottom side 132, a pair of opposing ends 136, and a length L measured from one end 136 to the other end 136. The stiffness of the support structure component 108 can vary, depending on the material(s) used to manufacture the support structure component 108 and/or the thickness of the support structure component 108. As one of ordinary skill in the art will appreciate, different materials have different Young's moduli. The support structure component 108 can, for example, be made of a bendable metal (e.g., brass, aluminum, copper, steel, tin, nickel), which tends to have a higher Young's modulus, or a plastic, rubber, foam, a visco-elastic material, or other suitably flexible material, which may have a lower Young's modulus than the bendable metal. Alternatively, the support 108 can be made of rigid parts (e.g. thicker plastic, metal) that can hinge with respect to each other.

As shown in FIG. 1B, the interlayer 106 has a top side 144 and a bottom side 148. The interlayer 106 can be or include one or more un-patterned and/or patterned layers, such as, for example, one or more layers of foam, rubber, visco-elastic, adhesive, other suitable material(s), or combinations thereof.

Figure 1C:
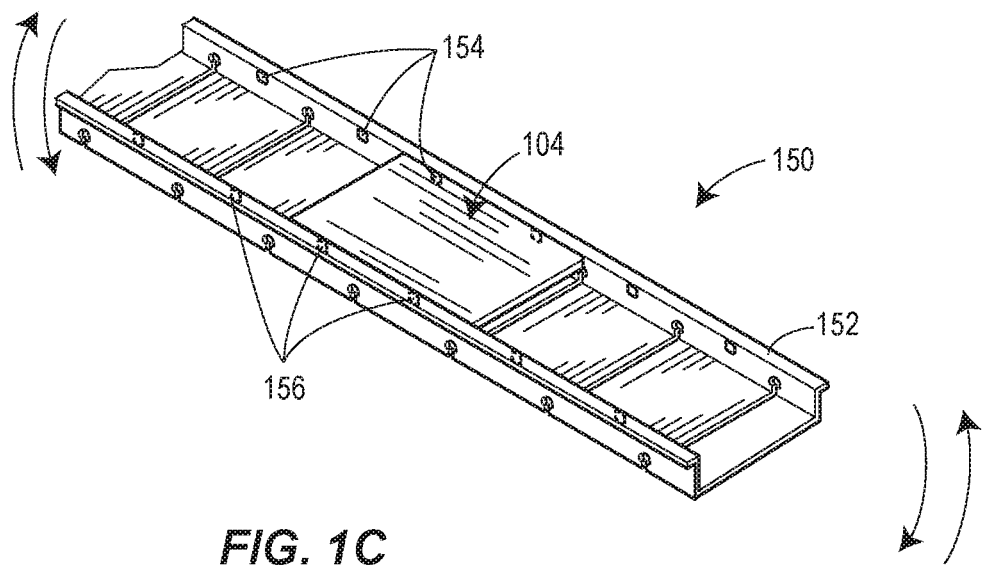
FIG. 1C is a perspective view of an example support structure component on which emitters and receivers of a touch interface, such as the touch interface integrated in the article illustrated in FIG. 1A, may be mounted.

In addition to supporting the flexible display component 104, the support structure component 108 of the article 100 may mount the plurality of emitters and receivers of the touch interface 102. For example, as illustrated in FIG. 1C, an example support structure component 150 (as further described in commonly owned U.S. Provisional Patent Application 61/946,412), which may be implemented as the support structure component 108, includes a bezel 152 along which a plurality of emitters and receivers of a touch interface may be mounted. In one implementation, a plurality of emitters may be mounted at one or more emitter positions 154 and a plurality of receivers may be mounted at one or more receiver positions 156 opposite the one or more emitter positions 154. The emitter positions 154 and the receivers positions 156 may be located at any suitable location on the bezel of the support structure component so as to emit and receiver light propagating across the surface of the flexible display component 104. Further, the emitter positions 154 and the receivers positions 156 may be spaced evenly or with any suitable spacing along the length of the support structure component 150. Still further, in some implementations, electrical connection to the plurality of emitters and receiver or portions of a plurality of emitters and receivers themselves may be disposed along surfaces of support structure component 150 other than the bezel 152 (e.g., a top or bottom surface of the support structure component 150).

Figure 1D:
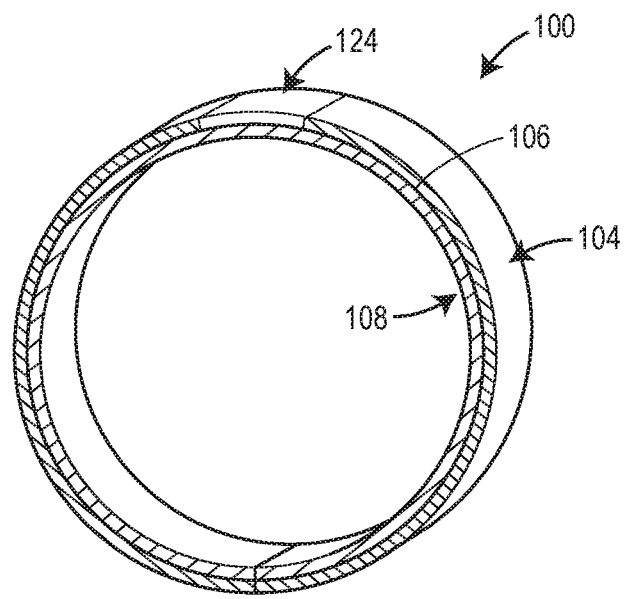
FIG. 1D is a cross-sectional view of the layers of the example article generally depicted in FIG. 1A in a flexed state.

The article 100 can also include a connection structure that functions to connect the ends 136 of the support structure component 108 together when the article 100 is bent, as illustrated in FIG. 1D, to form a circular, oval, or otherwise curved band. In some embodiments, the connection structure can be a magnetically-based connection structure, such as, for example, a connection structure in the form of magnets disposed within the support structure component 108 at or proximate to the ends 136, magnets disposed at the ends 136 so that the ends 136 connect end-to-end, or magnets disposed on the top or bottom sides 128, 132 at or proximate to the ends 136 so that the article 100 can be folded around on itself so as to create an article of variable length. One or more mechanical connectors (e.g., buckles, snap components, clasps, cooperating grooves and projections, cooperating tabs and recesses), any desired hook and loop connection material (e.g., Velcro), or some other connection means can be used instead of or in addition to the magnetically-based connection structure. These and other connection structures are described in further detail in commonly owned U.S. Provisional Patent Application 61/920,705, filed Dec. 24, 2013 and entitled "DYNAMICALLY FLEXIBLE, ATTACHABLE DEVICE HAVING AN INTEGRAL FLEXIBLE DISPLAY," the disclosure of which is hereby expressly incorporated by reference herein.

With the article 100 assembled in this way, the flexible support 108 is configured to support the flexible display 104 and limit local bending of the flexible display 104 beyond its bending range when the article 100 is curved or bent (e.g., to the curved position shown in FIG. 1D).

Electronics Module

Figure 2:
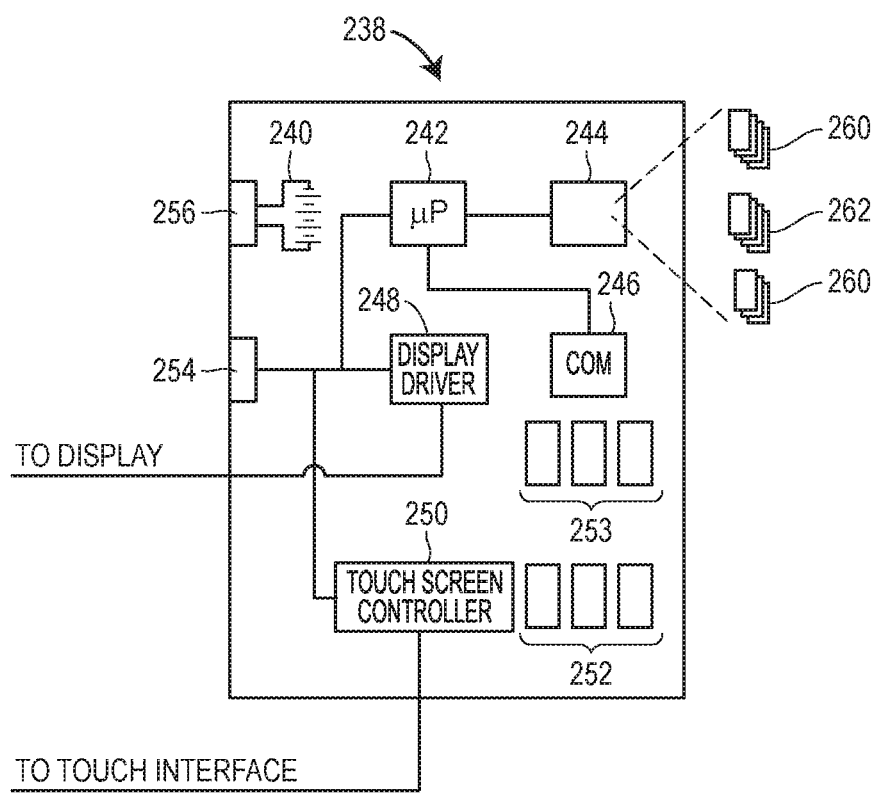
FIG. 2 is a block diagram of an electronics module that can be utilized in connection with any of the articles or product applications described herein.

FIG. 2 illustrates a block diagram of various electronic components, referred to herein as an electronics suite 238, that may be used in or disposed in the electronics module 124 of any of the attachable articles or devices described herein to drive the touch interface 102 and the flexible display 104 of the dynamically flexible, attachable article or device 100. In particular, the electronics suite 238 illustrated in FIG. 2 includes a battery 240 that powers a number of other modules or electronic components including a microprocessor or other processor 242, a computer readable memory 244, which may be, for example, a flash memory or other suitable type of non-transitory, tangible, data storage medium, a communication module 246, a display driver 248, a touch screen controller 250 and a number of sensors 252 and other secondary devices 253. The sensors 252 may include, for example, an impact sensor or step counter, one or more gyroscopic sensors or gyroscopes, temperature sensors, vibration sensors, pulse rate monitors, pressure sensors, strain gauges, etc. For example, the sensors 252 may include any number of any number of types of sensors, such as strain gauges, gyroscopes, accelerometers, compression sensors, tensional strain sensors, positional sensors, motion or movement sensors, pressure sensors, vibration sensors, temperature sensors, orientation sensors, gravity sensors, light sensors, and piezoelectric sensors, to name a few. The secondary electronic devices 253 may include, for example, an alarm or noise creation device, a speaker, a microphone, a vibrator the operation of which causes the clasp 14 or electronics module 19 to vibrate, etc. Although FIG. 2 illustrates the sensors 252 and the secondary electronic devices 253 as being integral with the electronics suite 238, in some cases, one or more of the sensors 252 and/or the secondary electronic devices 253 are physically disposed at one or more other locations along the band 12 separate from the remainder of the electronics suite 238. In these cases, though, the separately disposed sensors 252 and/or secondary electronic devices 253 remain in communicative connection with the remainder of the electronics suite 238 (e.g., via a wired or wireless connection).

Similarly, although FIG. 2 illustrates the display driver 248 as being integral with the electronics suite 238, in some cases, the display driver 248 is physically disposed at another location separate from the remainder of the electronics suite 238. In an example, the display driver 248 is disposed in a location that is proximate to the electrodes or connectors of the pixel elements of the flexible electronic display 104, e.g., on the backplane of the flexible display 104 or at some other suitable location. The separately located display driver 248, though, remains in communicative connection with the remainder of the electronics suite 238 (e.g., via a wired or wireless connection) despite of the remote locations.

As will be understood, the memory 244, the communication module 246, the display driver 248 and the touch screen controller 250, as well as the sensors 252 and other secondary electronic devices 253, are communicatively connected to the processor 242 and may operate to perform various functions in conjunction with applications or other programs implemented by the processor 242. Still further, each of these elements is connected to and is powered by the battery 240 in any known or desired manner. Still further, the electronics suite 238 of FIG. 2 may include one or more communication ports, such as communication port 254 (e.g., a USB or other type of digital communication port) and a power or battery charger input port 256. In this case, the power input port 256 may be connected to the battery 240 and enable charging or recharging of the battery 240 using any known or desired recharging circuitry and methodology. Alternatively or in addition, the communications input port 254 (in the form of for example, a USB input port) may be connected to the battery 240 and provide power to the battery 240 for charging battery 240, and the input port 254 may also be connected to the microprocessor 242, as well as to the communication circuit module 246, for performing wired-based communications via the input port 254. Of course, the communication input port 254, while being illustrated as a USB-type connection, could any other type of known wired or physical communication connection, including any desired serial or parallel digital communication port using any number of pins or wires, as is known in the art, an analog communication port, etc. Additionally or alternatively, the input port 254 may include a wireless input port for performing wireless communications.

In an embodiment, the power input port 256 may be a wireless input port for powering the article 10, and in this case may, for example, be part of a battery charger unit that operates to charge the battery 240 using, for example, an inductively coupled charging technique. If the battery charger unit is part of an inductively coupled charging system, it generally responds to electromagnetic waves produced by an exterior charging unit (not shown) to charge the battery 240 when the attachable article 10 is disposed near the external charging unit. In another case, the battery charger of the input port 256 may be a kinetic energy charger unit that converts motion of the device 10 (such as that associated with movement of an arm when the attachable electronic device 10 is in the form of a wristband) into electrical energy which is provided to charge the battery 240.

As will be understood, the processor 242, which may be a programmable, general-purpose processor or a specially programmed processor programmed using any desired type of hardware or firmware programming, generally coordinates and implements the operation of the display 104 and the associated electronic components as described in more detail herein. The computer readable memory 244 stores various applications, including for example the general operating system implemented by the processor 242, and various applications (illustrated as a set of applications 260 in FIG. 2) to be run on the processor 242 to implement various different types of functionality via the device 10, some of which will be described in more detail herein. The memory 244 may also store one or more data files 262, which may be, for example, image or video data files associated with various images to be displayed on the display screen 104 at various different times. Still further, the memory 244 may store application data that may be created by the various applications 260 or the microprocessor 242 as part of the operation of various applications 260 and to be used by those applications 260 either during runtime of the applications 260 or at other times. If desired, the microprocessor 242 or one of the secondary electronic components 253 may include or be a clock that tracks the current time, day, date, month, year, time zone, etc.

As an example, one or more of the applications 260 may implement various functionalities typically associated with standard computers or other types of electronic devices such as personal handheld electronic devices, including for example an e-mail application, an Internet or web-browsing application, an alarm clock application, a calendar application, a music-playing application such as an MP3 application, a video application, a digital picture slideshow application, a mapping application, an e-reading application which may provide books, notes, magazines or other types of articles, for reading by the user, etc. Still further, one or more of the applications 260 may operate on the processor 242 to turn the display 104 associated with the dynamically flexible, attachable device 10 into a slave display device that may be tied to or communicably coupled to an exterior master device that is generating content to be displayed via the flexible display 104. The master device, which may be a smart phone or a nearby computer device, may be wirelessly connected to the electronics suite 238 to provide content to be displayed on the flexible display 104 and will typically have more memory, and computing and processing power than the processor 242.

The communication module 246 of FIG. 2 may include or use any type of communication hardware/software/firmware that uses any desired types of communication techniques to enable the microprocessor 242 to communicate with exterior devices or sources. Of course, the communication module 246 could include multiple different types of communication hardware/software/firmware, including any kind of hard-wire-based communication module or wireless-based communication module. As examples, the communication module 246 may be a wired or wireless Internet-based communication module that may provide wired or wireless-based, IP protocol communications between the dynamically flexible, attachable article or device 10 and other devices or a communication network such as a LAN or a WAN to which other devices are communicatively connected. Likewise, the communication module 246 may include a near field communications (NFC) module, a radio frequency identification (RFID) communications module for communicating with, sending messages to and/or receiving messages from RFID tags stored in other devices around or close to the device 10. In this case, the communications module 246 may decode signals received from RFID tags in response to pings by the RFID communication module 246 to identify the RFID tags or tag numbers (identifiers) associated with these devices. Likewise, the communication module 246 may be a near field communication (NFC) module or a Bluetooth communication module, which may perform near field communications or Bluetooth communications in any known or desired manner with nearby NFC or Bluetooth enabled devices, thereby enabling wireless communication between the device 10 and other closely situated or closely located electronic devices. Still further, the communications module 246 may include a USB or other type of wired communication module for decoding and encoding USB-based communication signals to be sent out and received via the USB communication port 254.

As illustrated in FIG. 2, the display driver 248 is coupled to the microprocessor 242 and to the display 104, and drives the display 104 to present different images to a user and thus implement functionality via the display 104. The display driver 248 may be associated with or use any type of display driver technology associated with the various different types of flexible displays that might be used, including, for example, e-ink or other bi-stable display drivers, organic light emitting diode (OLED) display drivers, etc. Of course, it will be understood that the display driver 248 is connected to the various pixel elements or pixels of the flexible display 104 to cause the pixel elements to change their visual appearance so as to present content image on the flexible display 104. Typically, but not necessarily, each pixel element is communicatively connected to two electrodes, lead lines, connecting lines, or connectors corresponding the (x,y) coordinates of the particular pixel element on the flexible display 104. Thus, the display driver 248 provides image content (e.g., by using electrical signals or other suitable signals) to a set of connecting lines corresponding to a width of the flexible display 104 or its display area (and, in some cases, physically emanating from a width edge or transverse side of the flexible display 104 to the driver 248), and the same display driver 248 may provide image content (e.g., by using electrical signals or other suitable signals) to another set of connecting lines corresponding to a length of the flexible display 104 (and, in some cases, physically emanating from a length edge or longitudinal side of the flexible display 104 to connect to the driver 248). In an example, the display driver 248 provides image content to a set of transverse connecting lines and/or to a set of longitudinal connecting lines so that image content is presented on the display area of the flexible display. In an example, the article 10 includes multiple display drivers 248, each of which provides image content to a respective set of connecting lines.

Returning to FIG. 2, the display driver 248 illuminates or causes the pixel elements to obtain or reach a color, a lighting level, an on-off state, etc., so as to drive the display 104 to present various images and other functionality as determined by the particular application 260 being executed on the microprocessor 242. In some cases, the display driver 248 may cause various images, such as one or more artistic renditions, patterns, etc. or other types of images stored in the memory 244 to be displayed as one of the images 262 on the flexible display 104. Such an image may be any type of graphic element in the form of artwork, an indication of an association of the user with a particular university or other organization, such as a logo, a mascot, an icon, etc. In the case of a static display, and particularly when the flexible display 104 is a bi-stable type of flexible display, such as an e-ink type of display, the display 104 might display a particular image or background image whenever the device 10 is in a sleep mode, and thus in which the display driver 248 is not operating to actively drive the display 104.

Of course, the touch screen controller 250 is connected to a touch screen interface, such as the touch interface 102, and receives input signals from the touch interface 102. The controller 250 operates to decode these input signals to identify touch events that occur with respect to the touch interface 102. The touch screen controller 250 operates to energize and control the touch interface 102, as well as to recognize and decode touch screen events to identify, for example, the location of each touch screen event, a type of a touch screen event, such as a tap or a swipe movement, etc. If desired, the touch screen controller 250 alone or in conjunction with the processor 242 may operate to determine or recognize gestures that are input via the touch interface 102, such gestures being, for example, a slide, a squeeze, a swipe, a multi-finger pinch or any other type of gesture that includes one or more finger movements coordinated with one another. Each such gesture may indicate an action to be taken on or via the device 100.

Generally, the dynamically flexible, attachable article or device 100 may include other or different types of user input devices configured to detect user-generated gestures, such as interfaces that include buttons switches, roller balls, slide bars, pressure sensors, strain gauges, etc. Such user interfaces may enable the user to perform more rudimentary functions, such as scrolling movements, on-off powering movements, mode switching, etc. that are traditionally entered via actuate-able buttons or switches.

As previously discussed, the sensors 252 may include any of various different types of sensors. In an embodiment, the sensors 252 include one or more gyroscopes which detect movement of or the orientation of the device 100, rapid shaking of the device 100, etc. One or more of these types of movements may be considered to be a particular type of input or user input, such as a gesture to reset the device 100, to change a mode of the device 100, etc. Likewise, the output of such gyroscopes can be used by the microprocessor 242 to determine the orientation or direction of the flexible display 104 to enable the microprocessor 242, or an application 260 executed on the microprocessor 242, to determine the proper orientation of the image to be displayed on the flexible display 104. In some instances, such motion detection and position detection devices might be located in fasteners of the device 100 or the electronics modules 124, to enable the device 100 to more accurately determine whether the device 100 is oriented around a wrist or other circular member or whether it is instead laid out flat or oriented in some other manner. The microprocessor 242 or an application executed thereon may change functionality, behavior, and/or actions of the device 100 based on a detected orientation.

In some cases, the sensors 252 include one or more pressure or force sensors and/or strain gauges which detect pressure, strain, or similar forces that are considered to be an input to cause the functionality, behavior, and/or actions of the device 100 to change, e.g., reset the device 100, change a mode of the device 100, change a presentation displayed on the flexible display 104 of the device 100, etc. In one example, two pressure or force sensors are positioned on or attached to the device 100 (e.g., as part of the backplane of the flexible 104 or as part of the support structure component 108 so that when the dynamically flexible device 100 is attached to itself in a generally circular or looped configuration, the pressure or force sensors are diametrically opposed to each other.

Detecting Touch

Figure 3A:
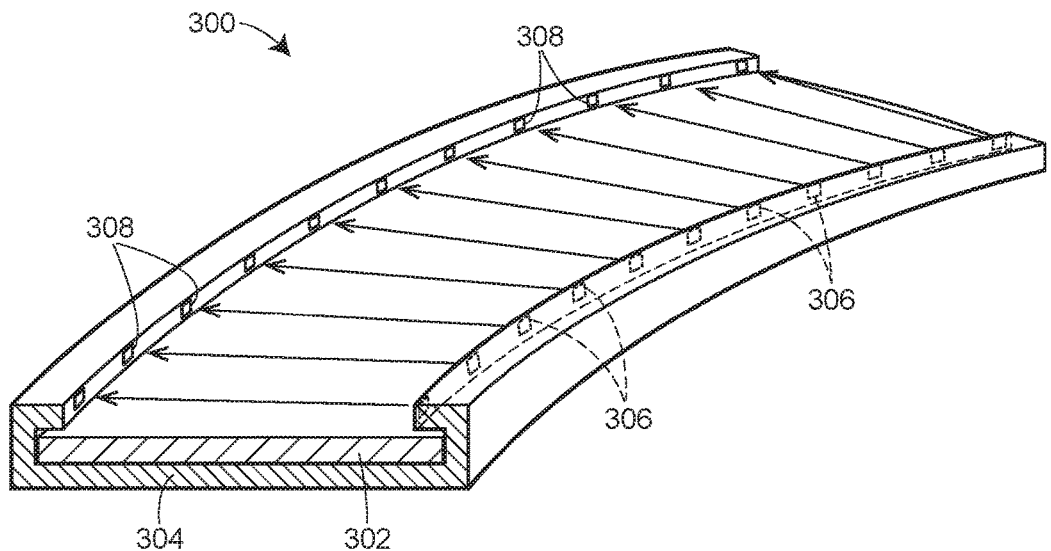
FIGS. 3A and 3B illustrate an example touch interface in which a plurality of emitters emit light across the surface of a flexible electronics component, such as the flexible display component illustrated in FIGS. 1A-1D.
Figure 3B:
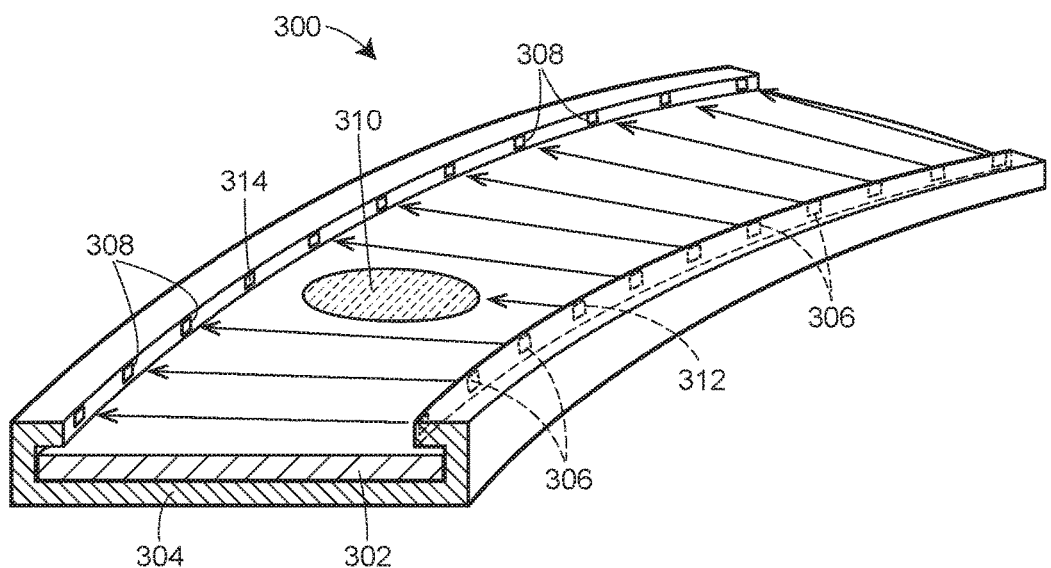

In an implementation, a touch interface being controlled by a touch controller detects a touch or a gesture on the surface of a flexible display or other flexible electronics component via a blocking and/or scattering of emitted light along one or more dimensions of the flexible display. FIGS. 3A and 3B illustrate an example device 300, or article, that may detect a touch via such a mechanism. The example device 300 may include any suitable combination of components described with respect to FIGS. 1A-1D and FIG. 2, but, for ease of discussion, some components, such as interlayers, are not depicted or described with respect to FIGS. 3A and 3B.

The device 300 includes a flexible display component 302 and a support structure component 304. The support structure component 304 mounts a plurality of emitters 306 of light and a plurality of receivers 308 that are part of a touch interface or system, such as the touch interface 102. The receivers 308 are positioned opposite from the emitters 306 on a bezel of the support structure component 304 so as to receive light emitted from the emitters 306 (as illustrated by the arrows in FIG. 3A). Each of the emitters 306 may emit light when controlled by a touch controller to emit light. In some cases, the touchscreen controller 250 may control each of the emitters 306 so as to emit light at different times from others of the emitters 306, and, in this way, signals indicative of received light from the receivers 308 may be accurately correlated with particular ones of the emitters 306. A touchscreen controller may, thus, "scan" the plurality of emitters independently of one another to detect touch events.

When a finger, stylus, or other object touches the surface of the device 300, as illustrated by an area 310 at which the object touches the surface, some of the light emitted by the emitters 306 is blocked and/or scattered by the touching object. For example, light emitted from a particular one of the emitters 306 (labeled as emitter 312) may not reach a corresponding one of the receivers 308 (labeled as receiver 314) opposite from the emitter 312, because the emitted light is blocked at the area 310 where the object touches the surface. Thus, a touch controller, such as the touch controller 250, determines a location of a touch along the length of the device 300 by determining which of the receivers 308 receive light from the emitters 306, where a touch location corresponds to a location along the length of the device 300 where light emitted from the emitters 306 is not received (or a negligible amount of light is received) at corresponding ones of the receivers 308.

Figure 4:
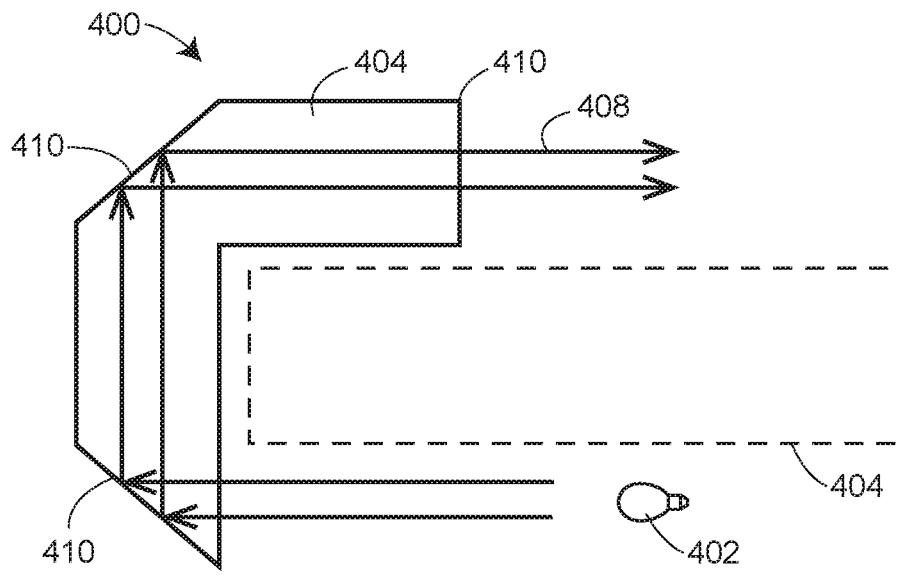
FIG. 4 is a cross-sectional view of an example emitter that can be implemented in the touch interface illustrated in FIGS. 3A and 3B.

FIG. 4 illustrates a cross-section of an example emitter 400 that may be implemented as one of the emitters 306. Some or all of the components of the emitter 400 may be mounted to, adhered to, or integrated with the support structure component 304 at locations along a bezel of the support structure component 304, as further discussed with reference to FIG. 1C. The example emitter 400 includes a light source 402 and an optical element 404 through which light emitted from the light source 402 propagates.

The light source 402 may emit light at any suitable wavelength. For example, in some implementations, the light source 402 may emit non-visible light, such as infrared light. In this manner, the light emitted from the light source 402 does not visually interfere with images or other content displayed on a flexible display component 406. The example light source 402 may include one or more light-emitting diodes (LEDs), lasers, incandescent bulbs, fiber optic elements, lenses, etc.

The optical element 404 may reflect, refract, and/or otherwise guide light emitted by the light source 402 across the surface of the flexible display component 406, as illustrated by the arrows 408. To this end, the optical element 404 may be constructed from a material with specific properties, such as specific indices of refraction, so as to reflect, refract, or otherwise guide light emitted from the light source 402. For example, the optical element 404 may include plastics, glass, or other materials or coatings fashioned to reflect light from the light source 402 at one or more facets 410, surfaces, or boundaries.

Figure 5:
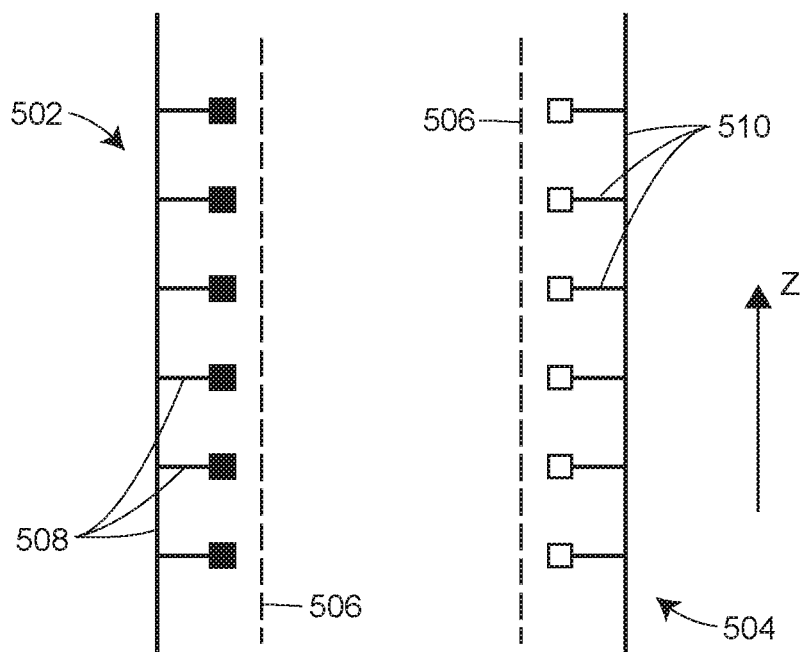
FIG. 5 is a schematic view of connections between a plurality of emitters, a plurality of receivers, and a touch controller, such as the touch controller illustrated in FIG. 2.

FIG. 5 is a schematic representation of a plurality of emitters 502 and a plurality of receivers 504 arranged along edges 506 of a flexible display component 508 to detect locations of touch events along a "z" direction. Each of the emitters 502 may be electrically connected to a touch screen controller via one or more emitter leads 508. In some implementations, the emitter leads 508 may include a particular lead from each of the emitters 502 (e.g., from a light source, such as light source 402) to a touchscreen controller. However, in other implementations, the emitter leads 508 from each of the emitters 502 may be bundled in any suitable manner, or may be input to any suitable intermediary components between the emitters 502 and a touchscreen controller, such as integrated circuits (ICs), switches, buses, etc. In any event, the emitter leads 508 facilitate control of the emitters 502 by a touchscreen controller. For example, the emitter leads 508 may allow the emitters 502 to receive voltage or current signals to operate light sources of the emitters 502.

Similarly, each of the receivers 504 may be electrically connected to a touch screen controller via one or more receiver leads 510. The receiver leads 510 facilitate communication of electronic signals (e.g., indicative of received light) from the receivers 504 to a touchscreen controller. For example, each of the receivers 504 may include a photo diode (PD), a charge coupled device (CCD), a complementary metal oxide semiconductor (CMOS) sensor, etc. configured to detect light emitted by the emitters 502. Upon detection of light, the receivers 504 may generate a voltage, current, or other signal indicative of, and in some cases proportional to, the received light. These signals indicative of the received light may be communicated to a touchscreen controller via the one or more receiver leads 510.

Figure 6:
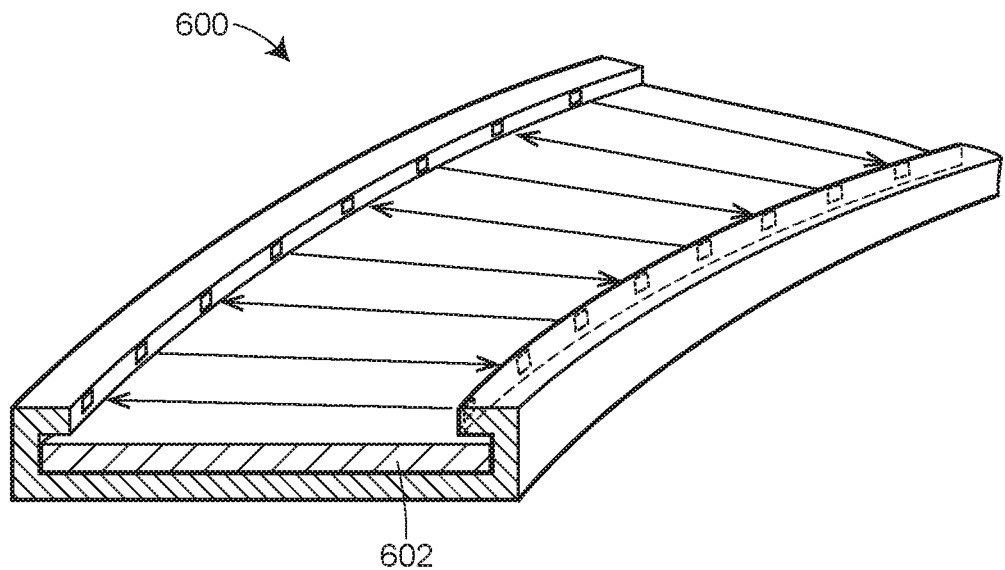
FIG. 6 illustrates another example touch interface in which a plurality of emitters are arranged in an alternating manner with a plurality of receivers.

Although, FIGS. 3A, 3B, 4, and 5 illustrate receivers on only one edge of a flexible display component and emitters on another edge of the flexible display component, a touch interface may include any suitable arrangement of emitters and receivers on either edge of a flexible display component. As illustrated in FIG. 6, a touch interface in an example device 500, for example, may include alternating emitters and receivers along edges of a flexible display component 502.

Further, some implementations of a touch interface may include a plurality of emitters that emit at a plurality of angles with respect to the surface of a flexible display component, or other flexible electronics component. In this manner, touch detection functionality may be maintained, even when a device or article is flexed to a variety of radii or angles. That is, emitting of light at a plurality of angles from emitters of a touch interface may allow a touch interface to be more robust in product implementations where asymmetric, extreme, or varied flexing is likely.

Figure 7:
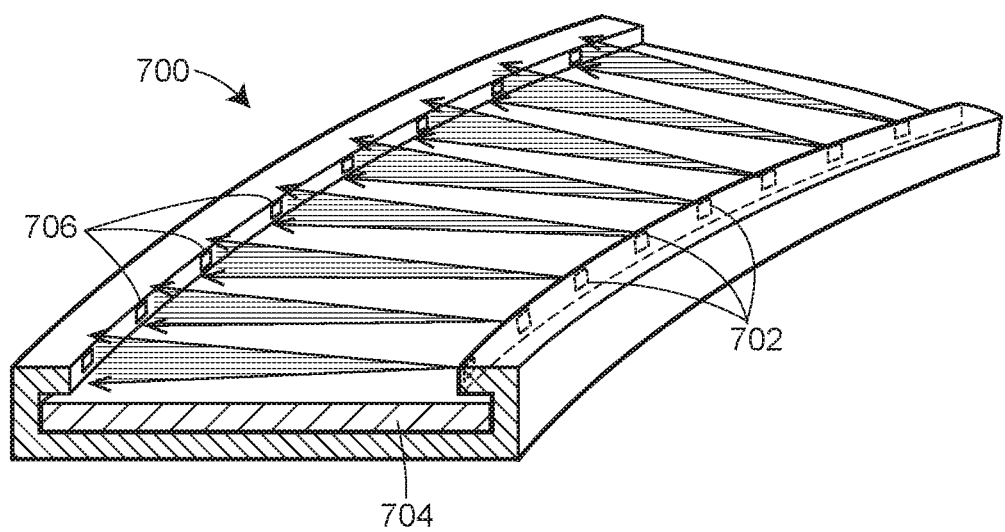
FIG. 7 illustrates another example touch interface in which a plurality of emitters emit light at various angles with respect to the surface of a flexible electronics component, such as the flexible display component illustrated in FIGS. 1A-1D.

FIG. 7 illustrates an example device 700 in which each of a plurality of emitters 702 emit light at a variety of angles with respect to the surface of a flexible display component 704, as illustrated by arrows in FIG. 7. This emission at a variety of angles may increase the tolerance for detecting touch in a bent or flexed configuration of the device 700, as a plurality of receivers 706 on a side opposite of the emitters 702 are effectively lowered in position with respect to the emitters 702.

Figure 8A:
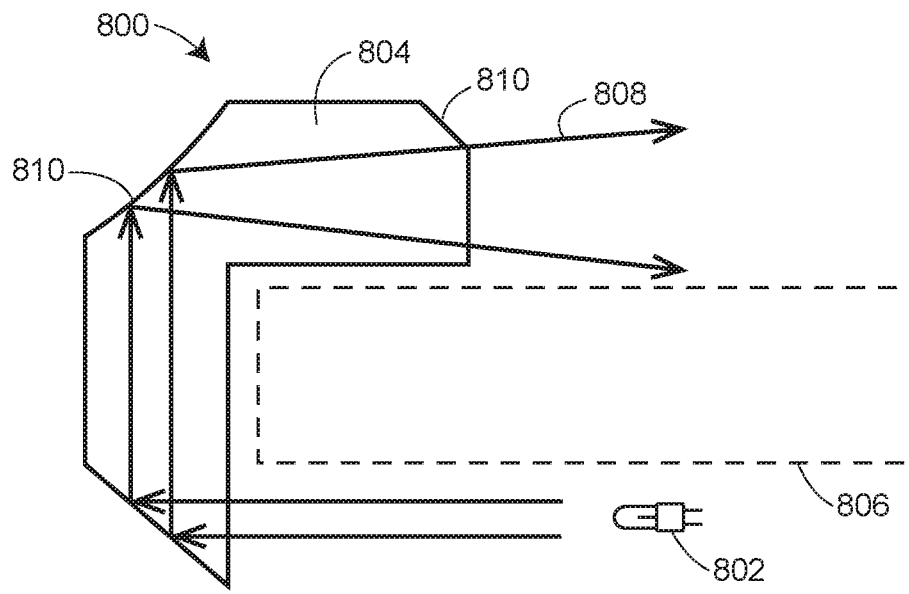
FIGS. 8A and 8B illustrate example emitters that may be implemented as one of the emitters of the touch interface illustrated in FIG. 7.
Figure 8B:
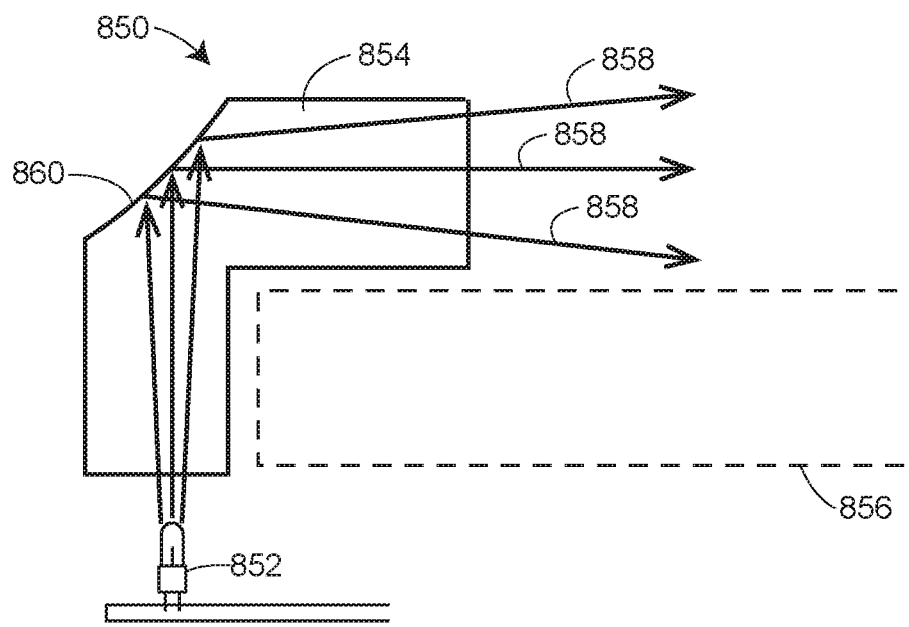

FIGS. 8A and 8B illustrate cross-sections of example emitters 800 and 850, respectively, that may be implemented as one of the emitters 702. The emitters 800 and 850 include light sources 802 and 852, respectively, which emit light that propagates through the optical elements 804 and 854 and across the surface of the flexible display components 806 and 856, respectively. As with the optical element 404, the optical elements 804 and 854 may be constructed from any suitable transparent material and may include one or more facets or boundaries for reflecting and/or refracting light emitted by the light sources 802 and 852. In these example implementations, however, the optical elements 804 and 854 may include concave or convex surfaces or boundaries, such as the surfaces 810 and 860, that spread the light emitted by the light sources 802 and 852 such that the light propagating over the surface of the flexible display components 806 and 856 propagates at a variety of angles, as illustrated by the arrows 808 and 858.

Although FIGS. 8A and 8B illustrate example optical elements with a certain number or placement of concave/convex surfaces, it is understood that optical elements may have any number of concave/convex surface for spreading and/or condensing beams of light. Further, as illustrated in FIGS. 8A and 8B, light sources may be positioned at any angle with respect to optical elements. For example, the light source 852 may emit light directly upwards into the optical element 854, whereas the light source 802 may emit light horizontally into the optical element 804.

Figure 9:
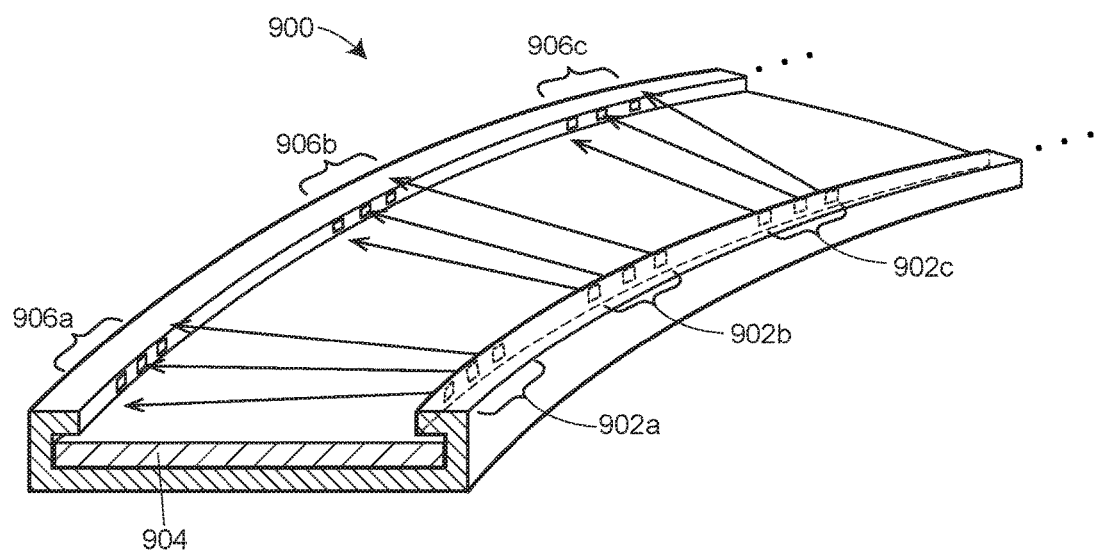
FIG. 9 illustrates another example touch interface in which a plurality of emitters are arranged into groups of emitters which emit light at various angles.

In some implementations, certain emitters in a touch interface may emit light at angles different from other emitters in the touch interface. As illustrated in FIG. 9, groups of emitters 902a, 902b, and 902c may be configured such that each emitter in each of the groups 902a, 902b, and 902c emits light at a different angle (with respect to a surface of the flexible display 904) than other emitters in each of the groups 902a, 902b, and 902c. Depending on the bending angle of a device 900 in which the groups of emitters 902a, 902b, and 902c are implemented, one or more of the groups 902a, 902b, and 902c will emit light that does not reach corresponding groups of receivers 906a, 906b, and 906c, while other of the groups of emitters 902a, 902b, and 902c may still emit light that reaches the corresponding groups of receivers 906a, 906b, and 906c. A combination of such a configuration of groups of emitters with a scanning the emitters one-by-one may provide a more robust touch detection system that is insensitive to reflections of emitted light from the surface of the flexible display component 904.

Also, emitters, such as the groups of emitters 902a, 902b, and 902c or the emitters 702, may emit light with a certain angular intensity distribution. That is, light emitted across the surface of the flexible display component 904 may included light emitted at a variety of angles with respect to the surface and a variety of intensities (either discretely or continuously varying). In such a case, an analog response, rather than a digital signal (e.g., on/off or one/zero), from a plurality of emitters may provide additional information about specific local bending angles, as further discussed with reference to FIG. 16.

A touch controller may operate each of the emitters in each of the groups of emitters 902a, 902b, and 902c independently of all the other emitters in the groups of emitters 902a, 902b, and 902c. The emitters may be scanned one-by-one to determine blockage or scattering of light from each of the emitters. In such an implementation, each of the emitters in the groups of emitters 902a, 902b, and 902c may include substantially similar components to the emitters 800 and 850 depicted in FIGS. 8A and 8B. However, it is clear that each of the emitters in the groups of emitters 902a, 902b, and 902c may share certain components or connections with other emitters in the groups 902a, 902b, and 902c. For example, a single light source may be a light source for each of the emitters in the group of emitters 902a, where a beam splitter, or other optical element, splits light or guides light from the single light source to each of the emitters in the group of emitters 902a.

Figure 10A:
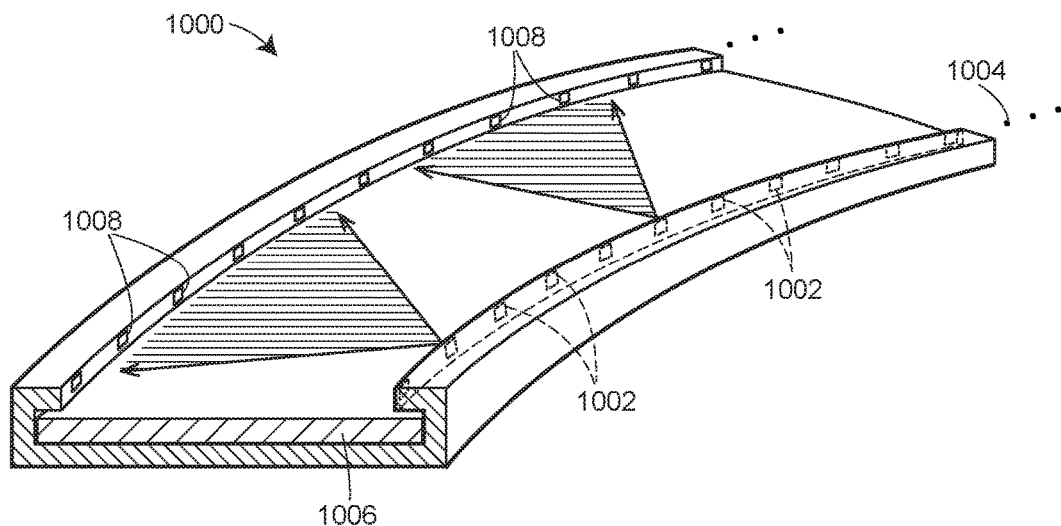
FIGS. 10A and 10B illustrate another example touch interface in which a plurality of emitters emit light at various angles with respect to an edge of a flexible electronics component, such as the flexible display component illustrated in FIGS. 1A-1D.
Figure 10B:
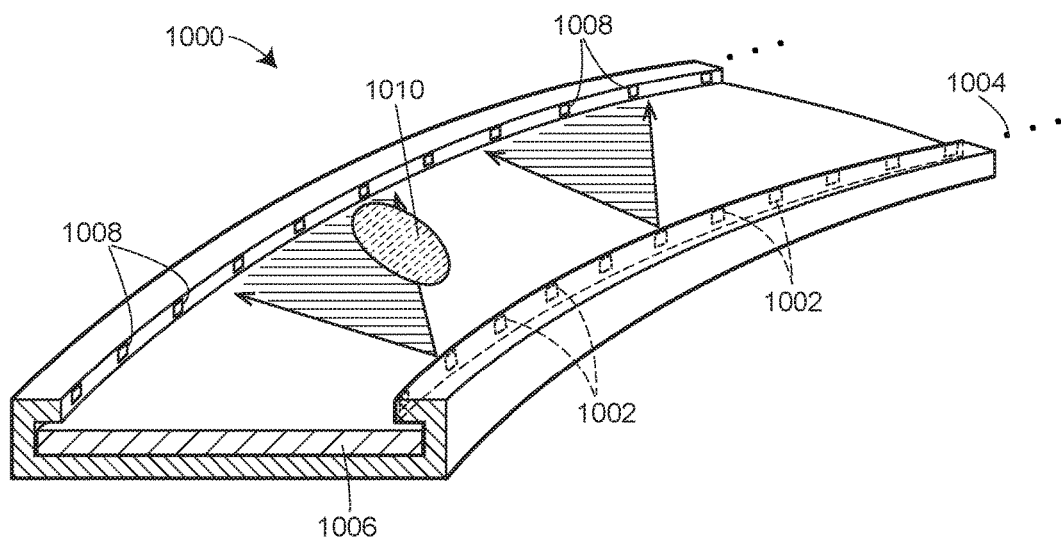

In addition to spreading or emitting light at a variety of angles with respect to the surface of a flexible display component, touch interfaces may include emitters that emit light at a variety of angles with respect to one or more edges of a flexible display component. FIGS. 10A and 10B illustrate such a touch interface implemented in a device 1000.

As depicted in FIG. 10A, each of a plurality of emitters 1002 of the example touch interface emit light at various angles with respect to the edge 1004 of a flexible display component 1006. As such, multiple of a plurality of receivers 1008 may receive light emitted by only one of the emitters 1002. When an object (e.g., a user's finger) touches the surface of the flexible display component 1006, as illustrated by the area 1010 in FIG. 10B, some, but not all, of the light emitted by one of the emitters 1002 may be blocked at the area 1010. The amount of blockage will depend on both a location of the touch along the length of the device 1000 and a location of the touch along the width of the device 1000. Thus, a touch controller may determine a two-dimensional location (i.e., a point or area) of the touch event on the surface of the flexible display component 1006 based on signals received from the plurality of receivers 1008. In some implementations, the touch controller may scan over each of the emitters 1002 and execute an algorithm to triangulate the two-dimensional position of the touch based on signals received at scans of each of the emitters 1002.

Although not illustrated in FIG. 10A or 10B, the emitters 1002 may include substantially similar components as the emitters 800 and 850. However, the emitters 1002 may include optical elements with one or more convex/concave boundaries having curvatures orthogonal to the emitters 800 and 850 so as to spread light at a variety of angles with respect to an edge of a flexible display component. It is clear that a touch interface may include emitters that spread light at a variety of angles with respect to a surface of a flexible display component and with respect to an edge of a flexible display component. Moreover, instead of each of the plurality of emitters 1002 emitting light at a variety of angles, a touch interface may include groups of emitters, where each emitter in a group of emitters emits light at a different angle with respect to an edge of a flexible display component as compared to other emitters in the group of emitters.

Generally, flexible touch interfaces may include any number and combination of the types of emitters described above arranged according to any ordering, spacing, and connectivity along edges of a flexible electronics component.

Emitters Utilizing Total Internal Reflection

In some implementations, touch interfaces may utilize totally internal reflected light in addition to or in place of light emitted above a surface of a flexible electronics component, such as a flexible display, as discussed above. That is, light emitted by emitters of a touch interface may emit light into a layer of a flexible display, and the emitted light may internally reflect inside of the layer before being blocked by a touch event or being received by a receiver.

Figure 11:
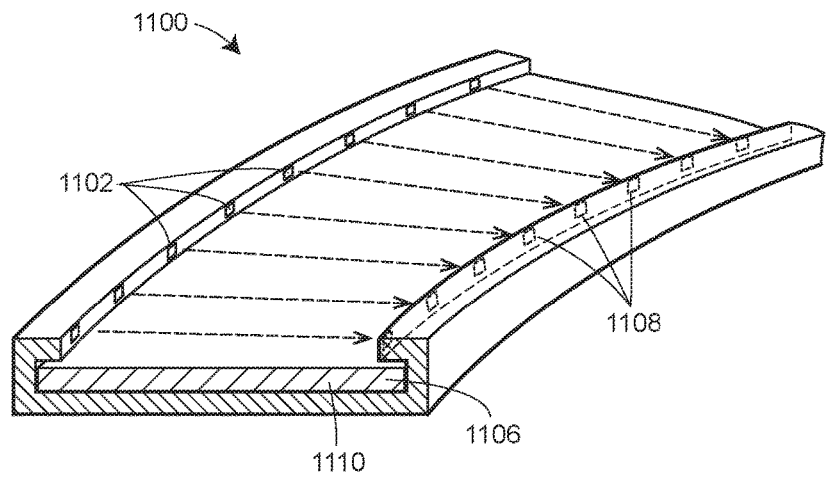
FIG. 11 illustrates another example touch interface in which a plurality of emitters emit light into a layer of a flexible electronics component or a layer attached to a flexible electronics component.

FIG. 11 illustrates an example device 1100 in which a plurality of emitters 1102 emit light into a layer of the flexible display component 1106 or into a layer on top of the flexible display component 1106. The light may propagate (via total internal reflection) in the layer into which it is emitted across the surface of the flexible display component 1106 towards a plurality of receivers 1108, as indicated by the dotted arrows in FIG. 11. In such an implementation, a support structure component 1110 may mount the emitters 1102 and receivers 1108 along the edges of the flexible display component 1106 at positions allowing emission of light into and detection of light out of the layer configured for total internal reflection.

Figure 12:
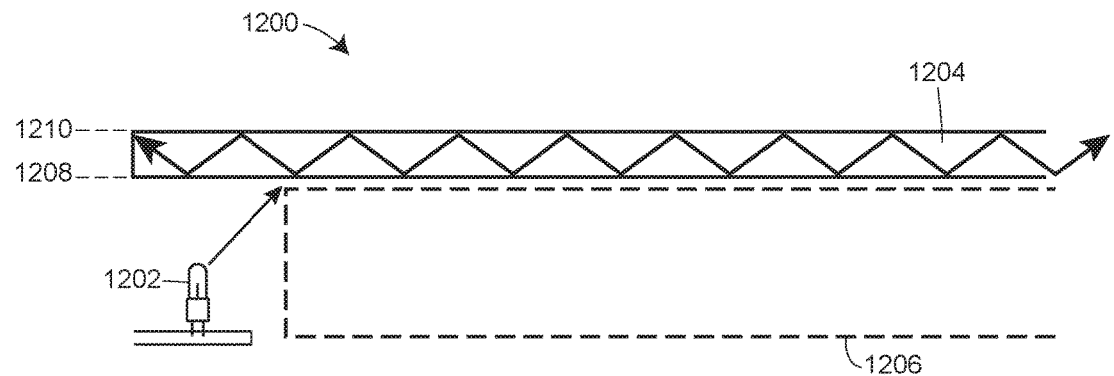
FIG. 12 illustrates an example emitter that can be implemented as one of the emitters of the touch interface illustrated in FIG. 11.

FIG. 12 illustrates a cross-sectional view of an example emitter 1200 which may be implemented as one of the emitters 1102 in FIG. 11. The example emitter 1200 includes a light source 1202 which may be substantially similar to one of the previously discussed light sources 402, 802, and 852. The light source 1202 emits light into a total internal reflection (TIR) layer on top of (e.g., adhered to or attached to) a flexible display component 1206. In some cases, the TIR layer may be integrated into a display stack of the flexible display component 1206, or the TIR layer may be separately mounted to a support structure component and/or the flexible display component 1206.

The light source 1202 of the example emitter 1200 emit at least some light that enters the TIR layer 1204 at a first edge 1208 of the TIR layer 1204. The light that enters the TIR layer 1204 then totally reflects off a second edge 1210 of the TIR layer 1204 before continuing to propagate through the TIR layer 1204 via total internal reflections. When an object touches the TIR layer 1204, the object may disrupt the total internal reflections of the propagating light. A touch controller may utilize such disruptions (e.g., scattering or blocking of light) to detect locations of touch events along the length of the device 1100, for example. As the TIR properties of layers have little sensitivity to bending, light may still propagate in a TIR layer when it is bent or flexed.

The TIR layer 1204 may include any suitable transparent material with a thickness that supports the total internal reflections as described above. The thickness of the TIR layer 1204 will depend on the wavelength of light corresponding to the light source 1202, the index of refraction of the TIR layer 1204, and the angle of at which emitted light from the light source 1202 is incident upon the TIR layer 1204. In some implementation, the TIR layer 1204 may include glass or various plastics such as polyimide, polyethylene terephthalate (PET), polycarbonate, polyethersulfone, polyether ether ketone (PEEK), and polyethylene naphthalate (PEN).

Although FIG. 12 illustrates the light source 1202 emitting light into the TIR layer 1204 from below, it is understood that light sources may be positioned in any suitable manner with respect to TIR layers. For example, a light source may be positioned so as to emit light directly into a TIR layer from a side of the TIR layer. In addition, emitters such as the emitter 1200, may emit light along more than one dimension of a device (e.g., along both a length and a width of a device). Also, the emitter 1200 may include additional lenses or other optical structures (not shown) to increase amounts of light coupled into the TIR layer 1204.

Figure 13:
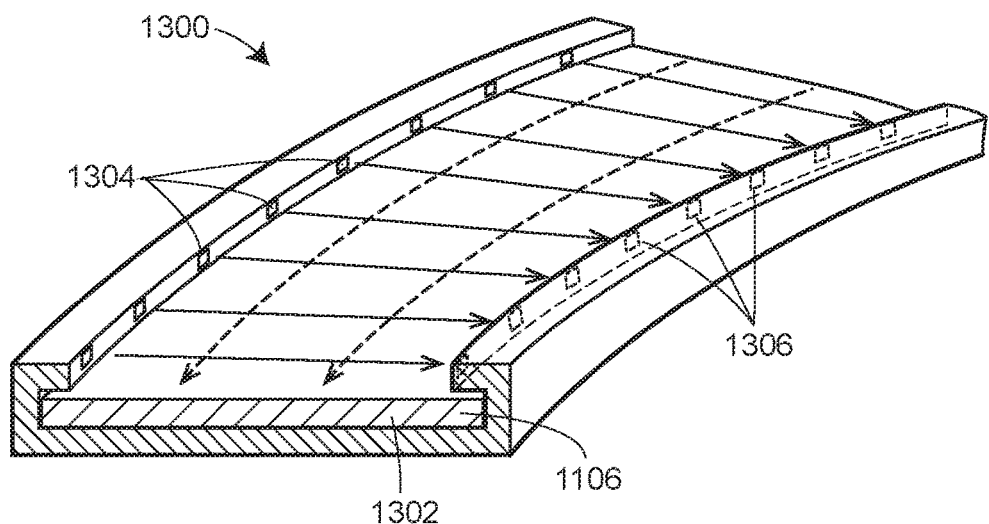
FIG. 13 illustrates another example touch interface in which a first plurality of emitters emit light above a surface of a flexible electronics component and other emitters emit light into a layer of a flexible electronics component or a layer attached to a flexible electronics component.

FIG. 13 illustrates an example touch interface, integrated into a device 1300, that utilizes both totally internally reflected light and light emitted above the surface of a flexible display component 1302. In the example touch interface, a first plurality of emitters 1304 emit light across the surface of the flexible display component 1302 and above the surface of the flexible display component 1302, as discussed further with respect to FIGS. 3A, 3B, and 4. Further, other emitters (not shown) may emit totally internally reflected light into a layer on top of the flexible display component 1302 that propagates perpendicular to the light emitted by the emitters 1304. A plurality of receivers 1306 may detect light from the emitters 1304 and other receivers (not shown) may detect totally internally reflected light. In this manner, a touch controller may determine a two-dimensional location of a touch (e.g., finger or stylus touch) based on received signals corresponding to the light emitted from emitters 1304 and the totally internally reflected light.

Figure 14:
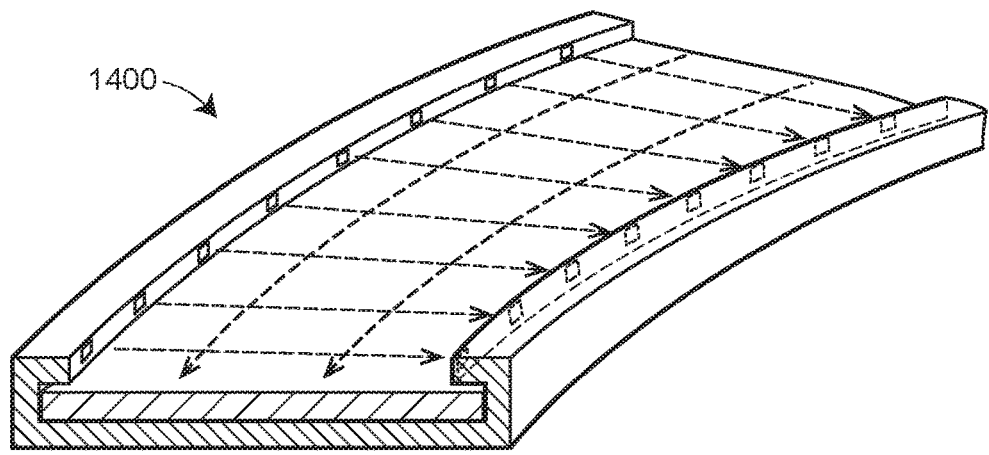
FIG. 14 illustrates another example touch interface in which a plurality of emitters emit light into a layer of a flexible electronics component or a layer attached to a flexible electronics component along two-dimensions.

Further, a touch controller may determine a two-dimensional touch location based on signals indicative of totally internally reflected light propagating along both the width and length of a flexible display component. For example, the device 1400 illustrated in FIG. 14 includes a touch interface in which light is emitted into a TIR layer in two-dimensions (illustrated by the dotted lines in FIG. 14). Generally, a touch interface controlled by a touch controller may utilize totally internally reflected light propagating along any suitable direction in a TIR layer.

Detecting Local and Global Bending

Some applications executing on a wearable article, such as the applications 260 executing on the electronics module 124 of the article 100, may respond to or be displayed based on a detection of whether the article 100 is currently in a flat state or in a flexed state. For example, content to be displayed to a user may not be displayed on the "bottom" side of the article 100 when in a curved state, whereas content may be displayed all along the length of the article 100 when in a flat state. In order to support such applications, or in order to provide other related functionality, a touch interface may detect whether a device in which it is implemented is in a flat state or a bent, or flexed, state (referred to as "global bending" or "bent/non-bent" herein).

Figure 15A:
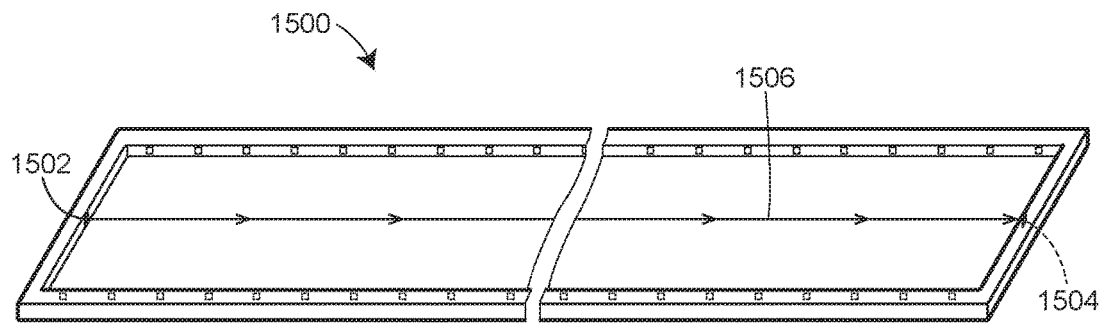
FIGS. 15A and 15B illustrate another example touch interface in which an end emitter and an end detector facilitate the detection of global bending.
Figure 15B:
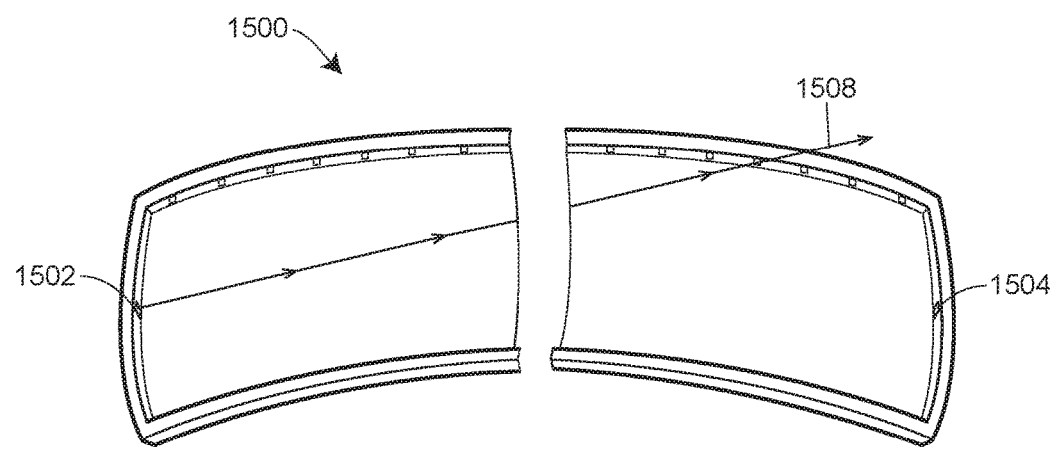

To this end, a touch interface may utilize emitters and receivers positioned at separate ends of a device to detect global bending. FIGS. 15A and 15B illustrate an example device 1500 in which a touch interface utilizes an end emitter 1502 and an end receiver 1504 to detect global bending of the device 1500.

When the device 1500 is in a flat state, as illustrated in FIG. 15A, the end emitter 1502 may emit light that propagates across the length of the device 1500, and is subsequently received by the end receiver 1504 (as illustrated by an arrow 1506). A touch controller may, therefore, determine a flat state of the device 1500 based on the receiving of emitted light at the end receiver 1504. On the other hand, when the device 1500 is in a flexed or bent state, light emitted by the end emitter 1502 will not reach the end receiver 1508 (as illustrated by an arrow 1508). As such, the touch controller determines a bent or curved based on a lack of received light at the end receiver 1502. The touch controller may detect a global bending state (e.g., flat or bent) and transmit this information to one or more of the applications 260, in an implementation.

Although only one end emitter 1502 and end receiver 1504 are depicted in FIGS. 15A and 15B it is understood that a touch interface may utilize any number of end emitters and receivers to detect global bending. Further, the end emitters and end receivers may include any of the components discussed with reference to FIGS. 4, 8A, and 8B and may utilize light emitted at any suitable variety of angles.

Some software applications executing on a wearable article, such as the applications 260 executing on the electronics module 124 of the article 100, may also respond to or be displayed based on a detection of whether the article 100 is bend or flat in certain areas along the length and/or width of the article 100. For example, a user may squeeze an article, such as article 100, in a certain area to select, or otherwise interact with, content displayed to a user on a flexible display component. Alternatively, an electronics module may shift content along the length of an article or change a display type of content based on whether or not certain areas of the article are bent or flexed. In order to support such functionality, or in order to provide related functionality, a touch interface may detect whether portions of a device in which it is implemented are flat or bent and, in some cases, how drastic a bending is at certain locations on a device (referred to as "local bending" herein).

To this end, a touch interface may utilize emitters that each emit at a variety of angles, such as those discussed with reference to FIGS. 7, 10A, and 10B, to detect local bending. Alternatively, a touch interface may utilize emitters that each emit at an angle different from that of other emitters in a group of emitters, such as those discussed with reference to FIG. 9, to detect local bending.

Figure 16:
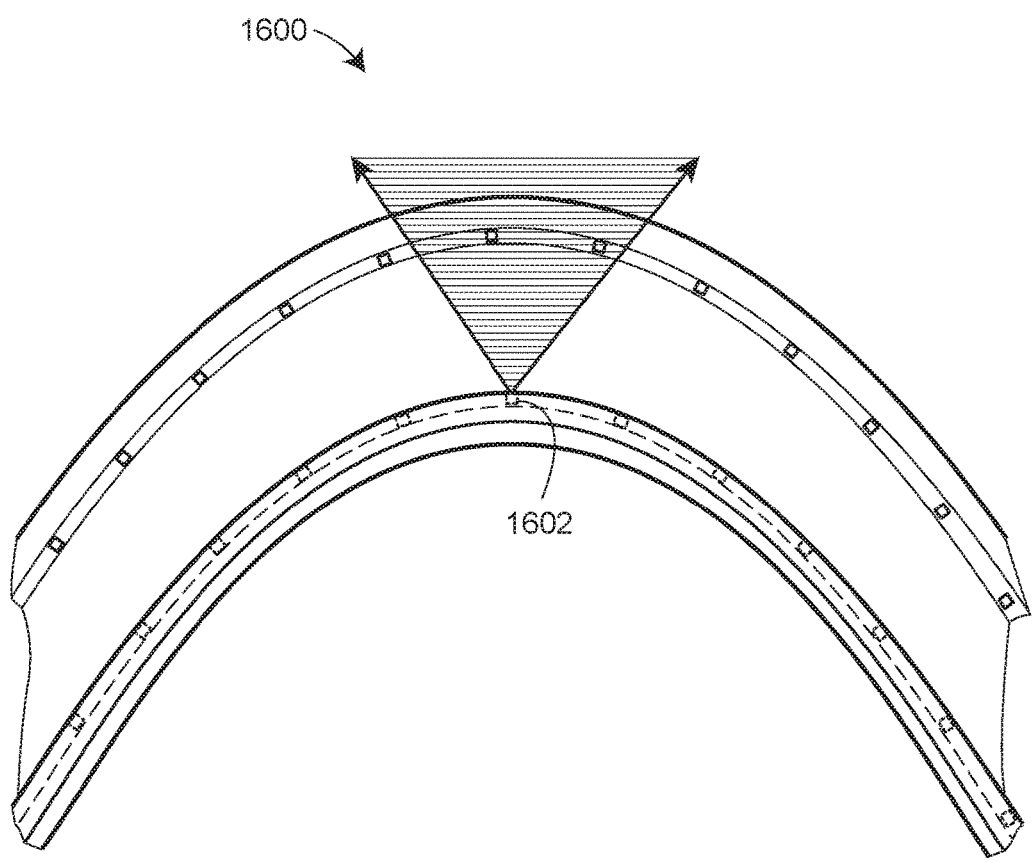
FIG. 16 illustrates another example touch interface for detecting local bending.

FIG. 16 illustrates an example device 1600 in which a touch interface utilizes emitters that each emit at a variety of angles to detect local bending. In a flat state, a plurality of receivers may detect emitted light spreading out from a single emitter, such as the emitter 1602. On the other hand, when the device 1600 is in a bent state as depicted in FIG. 16, a smaller number of receivers, or only one receiver directly opposite the emitter 1602, may detect light emitted from the emitter 1602. As such, a touch controller may utilize signals from a plurality of receivers to determine a local bending state of certain portions of the device 1600. For example, a touch controller may determine that any segments of a device in which light is only detected opposite to corresponding emitters are locally bent. Further, a touch controller may determine an amount of local bending at a location as proportional to the number of receivers that receiver light from a particular emitter at that location.

Also, emitters configured to emit light at a variety of angles with respect to the surface of a flexible electronics component, such as the emitters 702, may be utilized along with or as an alternative to emitters such as the emitter 1602 to detect local bending. If the emitters 702 emit light at a variety of intensities in addition to a variety of angles, a distribution of intensities may provide information about a local bending angle (as long as the bending angle is not so large as to lose a direct line of sight between an emitter and a receiver).

In some cases, a touch interface may only be able to detect two-dimensional bending when local bending is at or below a threshold of bending. Such a situation may arise when light emitted at a variety of angles is only detected at positions directly opposite to corresponding emitters, reducing touch sensitivity of a touch interface to one-dimension. In such cases, a touch controller may utilize a detection of local bending to adjust the interface of certain software applications from a two-dimensional interface to a one-dimensional interface.

Detecting Device Overlap

Some devices, such as wristband devices, smartwatches, or rollable/collapsible ereaders or mobile phones, may be configured to overlap in certain areas when attached to an operator or when completely or partially stored. Such overlapping devices are further discussed in commonly-owned U.S. Provisional Patent Application No. 61/969,531, entitled "DYNAMICALLY FLEXIBLE, ATTACHABLE DEVICE HAVING A FLEXIBLE ELECTRONIC DISPLAY," filed Mar. 24, 2014, the entire disclosure of which is hereby incorporated by reference herein.

In certain implementations, portions of a flexible display component may overlap with other portions of a flexible display component. A touch controller may detect an amount of such an overlap allowing software applications to only display content on portions of the flexible display device that are visible to a user (e.g., portions of the display not covered by other portions of the display).

Figure 17:
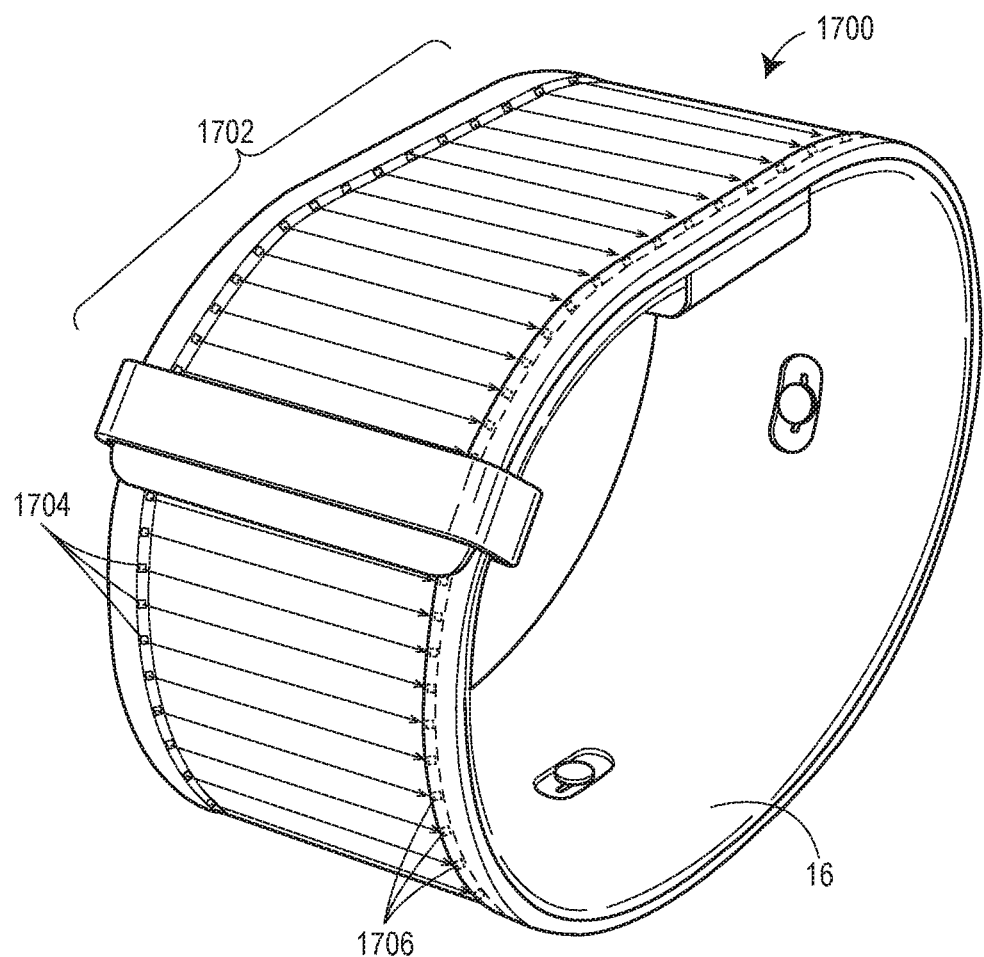
FIG. 17 illustrates another example touch interface for detecting overlap of a wearable device.

In one implementation, a touch interface may utilize a plurality of emitters and detectors along edges of a flexible display component to detect an amount of device overlap. FIG. 17 illustrates an example scenario in which a portion 1702 of a device 1700 is overlapped with itself. Some of a plurality of emitters 1704 of a touch interface are covered by the overlapping portion 1702 and other of the plurality of emitters 1704 are uncovered. Likewise, some of a plurality of receivers 1706 are covered by the overlapping portion 1702.

A touch controller, such as the touch controller 250, may detect the amount of overlap of the portion 1702 by detecting a disruption (e.g., scattering, reflecting, or blocking) of light from the plurality of emitters 1704 that are covered. In order to distinguish the overlap from real touch events (e.g., from a finger of a user) the underside of the device 1700 may be coated or otherwise covered with a reflective material. In this manner, light detected from reflections in the overlapping portion 1702 may be distinctly different, as indicated in signals from the plurality of receivers 1706, as compared with signals indicative of touch events, global bending, or local bending. The coating or covering of the underside of device 1700 may include small reflecting elements, a reflecting strip, or infrared absorbers. In another implementation, the underside of the device 1700 may include certain slits or grooves that allow light to pass to receiving with a unique pattern (e.g., formed by interference).

Flexible Display Component

In a general sense, flexible displays of any or all of the embodiments described herein, such as the flexible display 104 may be manufactured as any type of flexible display, such as an e-paper display, an organic light emitting diode (OLED) display, etc. and this flexible display, once manufactured, may then be formed, curved or bent in various manners. Generally speaking, flexible display 104 may be made of two flexible substrates including a backplane flexible substrate and frontplane flexible substrate placed back to back, next to one another, or laminated onto each other. In the case of e-paper, an additional layer of material such as an adhesive may be included in the frontplane and disposed between the backplane and the frontplane. In some cases, such as with the use of active-matrix OLEDs, electrophoretic displays (EPDs), e-paper, electronic ink displays, e-reader displays, liquid-crystal displays (LCDs), or other active-matrix type displays, the backplane includes a plurality of semiconductor devices or elements, e.g., an array of transistors and/or other elements, disposed thereon for driving or providing energization to individual lighting, transmitting, or reflective elements disposed in a similar array on the frontplane or on top of the transistors and/or other elements. The semiconductor devices or elements may be formed on the backplane in any known or desired manner, such as by etching, dye cut forming, printing, sputtering, spin-coating, spray coating, other deposition or patterning techniques, or combinations thereof, etc. Likewise, the light emitting, transmitting, or reflective elements may be formed as any desired types of light emitting, transmitting, or reflective elements using these same or different techniques, and the elements may include light emitting diodes (LEDs), OLEDs, e-paper, liquid crystal, etc. In the case of e-paper, for example, the frontplane and the backplane may be formed with black and white, oppositely charged particles suspended in a clear fluid which, when put in an electric field, will cause the black or the white particles to drift to the top of the display to create a white state, a black state, or an intermediate grey state. In any case, the substrate of the backplane and the frontplane may be formed of the same material or of a different flexible material, such as plastic or flexible glass, and these materials may have the same or different flexibility properties, as long as both materials are able to flex to the curvature needed for bending the flexible display 104.

More particularly, the flexible displays illustrated herein, may be manufactured as a flexible display, such as an e-paper display, an organic light emitting diode (OLED) display, etc. Generally speaking, the flexible displays may be constructed on two flexible substrates, or may be constructed on one flexible substrate but having at least two flexible substrates. The flexible substrates may include a backplane display area and frontplane display area placed back to back, next to one another, or laminated onto each other. The frontplane display area comprises an array of optic elements (e.g., electro-optic elements) provided on a first flexible substrate that are capable of displaying an image, while the backplane display area comprises an array of semiconductor devices or elements (e.g., transistor elements) provided on a second flexible substrate for driving or providing energization to the optic elements on the frontplane. Materials suitable for use as the flexible substrate for either the frontplane and/or the backplane include, but are not limited to, various plastic substrates such as polyimide, polyethylene terephthalate (PET), polycarbonate, polyethersulfone, polyether ether ketone (PEEK), and polyethylene naphthalate (PEN). Metallic foils or flexible glass also may be used.

Preferably, the backplane display area comprises an array of thin film transistors (TFTs) provided on a flexible, plastic substrate such as PET. The TFT array may include switching and/or driving TFTs, and additional elements such as storage capacitors, and interconnect wiring. An individual TFT element generally is made by successive deposition and patterning of conductor (i.e., source, drain, and gate electrodes), insulator (i.e., dielectric) and semiconductor thin film layers. The active semiconductor layer can be composed of either organic (small-molecule or polymeric semiconductors) or inorganic materials (such as amorphous silicon, low-temperature polycrystalline silicon, graphene, carbon nanotube, and metal oxide semiconductors).

The TFT array may preferably comprise organic TFTs (OTFTs) based upon an organic semiconductor described in at least one of U.S. Pat. No. 6,585,914; U.S. Pat. No. 6,608,323; U.S. Pat. No. 6,991,749; U.S. Pat. No. 7,374,702; U.S. Pat. No. 7,528,176; U.S. Pat. No. 7,569,693; U.S. Pat. No. 7,605,225; U.S. Pat. No. 7,671,202; U.S. Pat. No. 7,816,480; U.S. Pat. No. 7,842,198; U.S. Pat. No. 7,892,454; U.S. Pat. No. 7,893,265; U.S. Pat. No. 7,902,363; U.S. Pat. No. 7,947,837; U.S. Pat. No. 7,982,039; U.S. Pat. No. 8,022,214; U.S. Pat. No. 8,329,855; U.S. Pat. No. 8,404,844; U.S. Pat. No. 8,440,828; U.S. Patent Publication No. 2010/0252112; U.S. Patent Publication No. 2010/0283047; U.S. Patent Publication No. 2010/0326527; U.S. Patent Publication No. 2011/0120558; U.S. Patent Publication No. 2011/0136333; and U.S. Patent Publication No. 2013/0062598, the disclosure of each of which is incorporated by reference herein in its entirety for all purposes. While OTFTs may include metallic contacts and a dielectric layer composed of silicon oxide ($SiO_2$) or another inorganic oxide or nitride (such as $Al_2O_3$, $HfO_2$, $SiO_2$, or $Si_3N_4$), a dielectric layer composed of an electrically insulating polymer may be preferred. Exemplary polymeric dielectric materials include polyacrylates, polyimides, polyvinyl alcohol, polystyrene, polyester, polycarbonate, polyhaloethylene, epoxy resins, siloxane polymers, benzocyclobutene-based polymers. Other polymeric dielectrics are described in U.S. Pat. No. 7,605,394; U.S. Pat. No. 7,981,989; U.S. Pat. No. 8,093,588; U.S. Pat. No. 8,274,075; U.S. Pat. No. 8,338,555; U.S. Patent Publication No. 2011/0175089; U.S. Patent Publication No. 2011/0215334; and U.S. Patent Publication No. 2012/0068314. Conductive polymers such as poly(3,4-ethylenedioxythiophene) poly(styrenesulfonate) (PEDOT:PSS) may be used as alternative materials for metallic contacts in OTFTs.

Preferably, the TFT array may comprise metal oxide TFTs based upon a metal oxide semiconductor. For example, the metal oxide semiconductor can be selected from various mixed oxides including one or more of indium, zinc, tin, and gallium such as indium zinc oxide (IZO), zinc tin oxide (ZTO), indium gallium oxide (IGO), and indium gallium zinc oxide (IGZO). In a more preferred embodiment, the TFT array may comprise IGZO TFTs. While state-of-the art IGZO TFTs usually include thick layers of inorganic materials such as $SiO_2$, $SiO_x$, $Si_3N_4$, and $SiO_xN_y$, as dielectric and passivation layers, it is preferred that if the TFT array backplane comprises metal oxide TFTs, organic materials are used in at least some of the dielectric and passivation layers, such that the thickness of the remaining inorganic layer(s) may be reduced to allow maximum flexibility of the TFT array as whole. Metal oxide TFTs incorporating one or more organic layers are described in U.S. Pat. No. 8,017,458; U.S. Pat. No. 8,097,877; U.S. Pat. No. 8,395,150; and U.S. Patent Publication No. 2012/0223314, the disclosure of each of which is incorporated by reference herein in its entirety for all purposes.

In some scenarios, such as for an electrophoretic or e-reader display, the frontplane display area may be laminated, sealed to, or otherwise secured onto the backplane display area. The frontplane display area may be produced by forming a subassembly that comprises, in sequence, a flexible substrate, a conductive electrode layer, an electro-optic layer, and optionally, an adhesive layer to allow lamination to the backplane. In the case of an OLED display, the electro-optic layer is sandwiched between two electrode layers and is typically built on the TFT array. Generally, at least one of the two electrode layers is transparent, often composed of a transparent conductive oxide such as indium tin oxide (ITO). The electro-optic layer is composed of an organic material capable of emitting light when a voltage is applied across the two electrode layers. The organic light-emitting material may have a stacked structure including a plurality of different organic layers. In addition to one or more emissive layers, the stacked structure may include additional layers such as a hole-injection layer, a hole-transport layer, an electron-transport layer, a hole-blocking layer, and/or an electron-blocking layer to enhance device performance. Individual OLED elements may have different emitters (for example, a red emitter, a green emitter, or a blue emitter) in their emissive layer to provide a colored image. Exemplary OLED device structures and materials are described in U.S. Pat. Nos. 5,707,745, 5,844,363, 6,097,147, 6,303,238, and 8,334,545, the disclosure of each of which is incorporated by reference herein in its entirety for all purposes.

In the case of an e-paper display, the electro-optic layer may be composed of an encapsulated electrophoretic medium. The encapsulated electrophoretic medium generally comprises numerous small capsules, each of which itself comprises an internal phase containing electrophoretically-mobile (e.g., black and/or white) particles suspended in a liquid suspending medium, and a capsule wall surrounding the internal phase. Typically, the capsules are themselves held within a polymeric binder to form a coherent layer positioned between two electrode layers. Most commonly, one electrode layer has the form of a single continuous electrode, while the other electrode layer is patterned into a matrix of pixel electrodes, each of which defines one pixel of the display. Electronic charges are applied to the capsules to bring particles of a selected color to the surface. Electrophoretic media and related display device structures are described in, for example, U.S. Pat. No. 5,930,026; U.S. Pat. No. 6,831,769; U.S. Pat. No. 6,839,158; and U.S. Pat. No. 7,170,670, the disclosure of each of which is incorporated by reference herein in its entirety for all purposes. In addition to electrophoretic displays, other e-paper display technologies include electrowetting displays, and electrofluidic displays as described in, for example, U.S. Pat. No. 7,446,945 and U.S. Pat. No. 8,111,465, the disclosure of each of which is incorporated by reference herein in its entirety for all purposes.

To integrate the TFT array backplane with the frontplane for a completed display system, the bottom or pixel electrode of the frontplane is (connected) to the drain or source electrode of the switching TFT in an e-paper display, and the driving TFT in an active matrix OLED (AMOLED) display.

Various organic layers on either the frontplane and/or the backplane may be formed on the flexible substrate by solution-phase deposition techniques such as spin-coating, slot coating, die coating, printing (e.g., inkjet printing, screen printing, pad printing, offset printing, gravure printing, flexographic printing, lithographic printing, mass-printing and the like), spray coating, electrospray coating, drop casting, dip coating, and blade coating. Inorganic (e.g., metallic or metal oxide) layers usually are deposited by physical or chemical vapor deposition methods (e.g., sputtering), but may be solution-processed if a soluble precursor is available. The layers may be patterned into specific elements by photolithography, either by use of the intrinsic photosensitivity of the layers (e.g., certain polymeric layers) or by use of a photoresist (e.g., metallic, metal oxide, or small-molecule organic layers).

Figure 18:
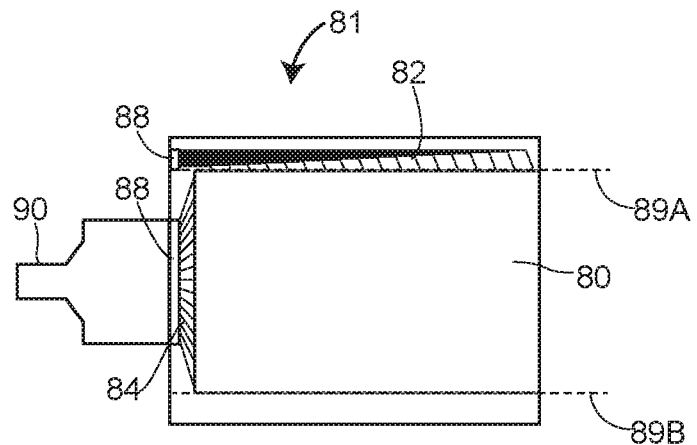
FIG. 18 illustrates a base or backplane layer of a flexible display.

Moreover, it may be desirable to manufacture the flexible display 104 in a manner that maximizes the amount of the display area space viewable on the top layer of the device 100. In this regard, FIG. 18 illustrates a base or backplane layer 81 of a flexible display 104 as manufactured. Generally speaking, the backplane of a flexible display 104 comprises a flat surface, or a first display substrate, and has a display area with various electrical energizing elements (e.g., transistors) formed, printed, etched or otherwise disposed thereon. As is known, the electronically energizing components on the backplane substrate of a backplane component are then operatively connected to electronically energizable components, such as organic light emitting diodes (OLEDs), encapsulated electrophoretic media (e.g., as in an e-paper display), etc., disposed on or formed on a frontplane component or monolithically integrated on top of a backplane component. Both the backplane substrate of the backplane component and the frontplane substrate of the frontplane component are flexible, and the backplane substrate and the frontplane substrate are aligned to provide a register between various energizing components and energizable components to thereby form pixels on the display area. In particular, the flexible display may be made of two or more layers including a backplane display substrate on which various display elements, such as pixel elements, associated with each pixel of the display are printed, etched or otherwise manufactured in the form of, for example, transistors or other switching elements, a secondary or frontplane display substrate on which OLEDs, e-ink microcapsules or other energizable components that form black and white or various colors on the display for each pixel, and, in some cases a further flexible substrate layer that operates as a ground layer. In some embodiments, such as in electrophoretic displays, the frontplane and backplane are laminated together as frontplane and backplane components. In some embodiments, the flexible display 48 may be built in layers, e.g., starting with the backplane and ending with attaching the frontplane substrate.

As illustrated in FIG. 18, the display area 80 formed on the backplane component 81 of such a display 18 may be generally rectangular in shape and have a large aspect ratio, e.g., an aspect ratio where the length of the display area 80 is at least two times greater than the width of the display area 80, and, in some configurations, is at least five times greater than the width. The display area 80 includes any number of pixels or pixel elements, each of which may be connected to at least two lines (e.g., electrical lines, lead lines, electrodes, connecting lines or connectors) for energization thereof. The electrical lines or connecting lines are disposed at the pixel elements and exit from the display area 80 via various sides of the display area 80. Generally, each line services a particular row or column of pixel elements. As such, in FIG. 18, the connection lines are illustrated as a first set of connecting lines 82 coming from one of the longitudinal sides and including a line 82 for each of y columns of pixels of the display area 80 (e.g., a set of longitudinal connecting lines), and a second set of connecting lines 84 coming from one of the transverse sides of the display area 80 and including a line 84 for each of x rows of pixels of the display area 80 (e.g., a set of transverse connecting lines). As is known, energization or connection between a particular connecting line 82 of a column $y_n$ and a connecting line 84 of a row $x_m$ of the display area will energize or turn on that corresponding pixel, and, as such, the corresponding pixel may be referred to using its two-dimensional coordinates, e.g., ($x_m$, $y_n$) or ($y_n$, $x_m$). In any event, as illustrated in FIG. 18, the sets of connecting lines 82, 84 exit from the display area 80 along the same backplane substrate 81 and are connected to one or more multiplexer or IC driving circuits 88, which may be formed, for example, on or near the edge of the backplane display substrate 81. The driving circuits 88 may be integral with the display driver 48 of the electronic suite 38, or the driving circuits 88 may be disposed separately from but nonetheless communicatively connected to the display driver 48, e.g., the driving circuits 88 are disposed on a flexible connector 90 connecting the backplane layer 81 to the electronics module 19. Typically, the flexible connector 90 is not integral with the backplane layer 81, but instead is a separate element that couples to the backplane layer 81 to communicate with the electronics module 19 and components included therein, such as the display driver 48.

Figure 19:
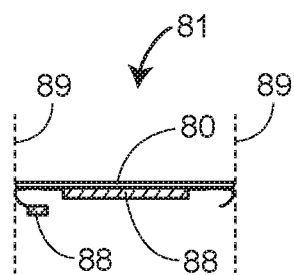
FIG. 19 illustrates a manner of folding or bending a substrate to form a flexible display.

FIG. 19 illustrates a manner of folding or bending the substrate 81 of FIG. 18, to form a display that includes a maximum amount of display area 80 on the top thereof that is viewable to the user, so as to maximize the amount of area on the band 12 at which the display area 80 is viewable and to minimize the area of edges surrounding the display area 80 that are visible to the user. (For ease of viewing, the flexible connector 90 is not shown in FIGS. 53-54.) In FIG. 19 in particular, the bending may occur along the dotted line 89A, illustrated in FIG. 18, so as to fold over the backplane sections adjacent to the longitudinal side of the display area 80 at which the connecting lines 82 are disposed. This folding enables the connecting lines 82 to be bent down and under the display area 80, and enables the multiplexer or IC driving circuits 88 to be connected to the display driver 48 (disposed in, for example, one of electronics module 19 not shown in FIGS. 18 and 19) via separate electronics or electrical connections. Thus, as illustrated in FIG. 19, which depicts a cross-sectional end view of the flexible display 104, the flexible display 104 so formed and bent enables the separate longitudinal display lines 82 to be connected to different multiplexer or driving IC circuits 88, which are ultimately connected to the display driver 48 of FIG. 48, in order to energize the rows and columns of pixel elements of the flexible display 104 to thereby drive the display 18. As the fold 89A occurs along the edge of the display area 80, the areas of the backplane substrate of the flexible display 104 that are used to form the connecting lines 82 are disposed in a different plane than, and are disposed in some cases under the display area 80, and thus do not require the backplane substrate 81 to extend out towards the sides of the band 12 much beyond the edges of the display area 80. This configuration, in turn, enables the maximal amount of viewable display area to be disposed on the top portion of the band 12 which maximizes the viewable or usable area of the band 12 at which the display 18 can present viewable images. In some embodiments, the backplane substrate 81 may also be bent along the dotted line 89B along the opposite longitudinal side, even if the opposite longitudinal side does not support any electrodes or connectors thereon, e.g., for ease of manufacturing and/or for aesthetic considerations.

Figure 20:
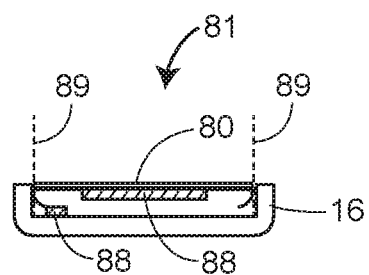
FIG. 20 is a cross-sectional view of a flexible display disposed in or on a support structure component, such as the support structure component illustrates in FIGS. 1A-1D.

FIG. 20 illustrates a cross-sectional view of the display 18 bent as illustrated in FIG. 19 and disposed in or on a flexible support 16 of the band 12, with the display 18 having the maximal display area 80 thereon disposed up to the edges of the band of the device 10. In this case, the flexible support 16 is illustrated as having sidewalls to form a protective barrier to protect the display 18 at the edges thereof from side impacts. Of course, other manners of manufacturing the display 18 could be used and implemented to produce the dynamically flexible, attachable article or device 10.

In some cases (for example, due to the size of the display area 80, the material composition of the flexible display 104, etc.), bending the backplane layer 81 so that the electrodes or connectors 82 are under the display area 80 may cause undesirable effects, such as interference between various electrical components of the backplane layer 81. Further, in order for the flexible display 104 to be as dynamically flexible as possible, the impact of the more rigid portions of the backplane layer 81 (e.g., the portions which support the less-flexible or rigid driving circuits 88) on the flexibility of the display area 80 is desired to be minimized. Still further, a minimum border extending from the display area 80 and viewable to a user may be necessary to seal the top and bottom layers of the flexible display 104, e.g., by using an environmental barrier material for the frontplane and backplane substrates and the seal, or by some other means. In electrophoretic displays, for instance, the required width of a border for sealing is typically around 2 to 6 mm.

ADDITIONAL CONSIDERATIONS

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

These and other variations, modifications, additions, and improvements fall within the scope of the subject matter of the present disclosure.

Additionally, certain embodiments are described herein as including logic or a number of components, modules, or mechanisms or units. Modules and units may constitute either software modules (e.g., code stored on a non-transitory machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits, lines and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for flexible touchscreen interfaces as disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrangement, operation and details of the methods and structure disclosed herein without departing from the spirit and scope defined in the claims.

The invention claimed is:
1. A touch interface moveable in multiple dimensions between a first state and a second state, the touch interface comprising:
   a plurality of emitters arranged along a first edge of a flexible display component to emit light that propagates across a surface of the flexible display component, wherein when the touch interface is in the first state, the plurality of emitters are in a first position, and when the touch interface is in the second state, at least one of the plurality of emitters is in a second position different from the first position;
   a plurality of receivers arranged along a second edge of the flexible display component to detect light, wherein when the touch interface is in the first state, the plurality of receivers are in a third position, and when the touch interface is in the second state, at least one of the plurality of receivers is in a fourth position different from the third position;
   a touch controller coupled to the plurality of emitters and the plurality of receivers, the touch controller configured to:
      cause one or more of the plurality of emitters to emit light,
      receive, from the plurality of receivers, one or more signals indicative of detected light at the plurality of receivers, and
      determine at least one of a user interaction with the flexible display component or a current state of flexing of the flexible display component based on the one or more signals indicative of light detected at the plurality of receivers.

2. The touch interface of claim 1, wherein at least some of the plurality of emitters are configured to emit light at a plurality of degrees with respect to the surface of the flexible display component.

3. The touch interface of claim 2, wherein the touch controller coupled to the plurality of emitters and the plurality of receivers is configured to determine the current state of flexing based on a distribution of light emitted from the plurality of emitters configured to emit light at the plurality of degrees with respect to the surface of the flexible display component.

4. The touch interface of claim 3, wherein the distribution of light includes a distribution of intensities.

5. The touch interface of claim 1, wherein at least some of the plurality of emitters are configured to emit light at a plurality of degrees with respect to the first edge of the flexible display component.

6. The touch interface of claim 1, wherein determining, by the touch controller, the user interaction includes determining a local bending of a portion of the flexible display component based on the one or more signals indicative of light detected at the plurality of receivers.

7. The touch interface of claim 6, wherein the first edge of the flexible display component is opposite and parallel to the second edge of the flexible display component, and wherein determining the local bending of the portion of the flexible display component includes determining that the one or more signals indicate at least one of:
   (i) a detection of light at one or more of the plurality of receivers in a direction perpendicular to the local bending and a detection of only negligible amounts of light at other of the plurality of receivers, or
   (ii) intensities indicative of the local bending of the portion of the flexible display component.

8. The touch interface of claim 1, wherein the plurality of emitters are arranged along the first edge of the flexible display component in a plurality of groups of emitters, and wherein at least one of the plurality of emitters in each of the plurality of groups of emitters emits light at an angle with respect to the surface of the flexible display component different from an angle at which others of the plurality of emitters in each of the plurality of groups of emitters emits light.

9. The touch interface of claim 1, wherein the plurality of emitters emit at least some light that propagates across the surface of the flexible display component in a layer of the flexible display component via total internal reflection.

10. The touch interface of claim 1, wherein the touch controller is configured to determine a global bending state of the flexible display component based on the one or more signals indicative of light detected at the plurality of receivers.

11. The touch interface of claim 1, wherein the touch controller is configured to determine an overlap of a device in which the touch interface is integrated based on the one or more signals indicative of light detected at the plurality of receivers.

12. The touch interface of claim 11, wherein the touch controller determines the overlap based on a reflection pattern received at the plurality of receivers unique to the overlap of the device.

13. The touch interface of claim 1, wherein the plurality of emitters emit at least some light that propagates across the surface of the flexible display component in a layer of the flexible display component via total internal reflections and at least some light that propagates across the surface of the flexible display component above the flexible display component.

14. A flexible electronics assembly comprising:
- a flexible display component movable in two dimensions between a first state and a second state;
- a support structure component adhered to the flexible display component; and
- a touch interface, the touch interface including:
  - a plurality of emitters mounted to the support structure component and arranged along a first edge of the flexible display component to emit light that propagates across a surface of the flexible display component, wherein when the flexible display component is in the first state, the plurality of emitters are in a first position, and when the flexible display component is in the second state, at least one of the plurality of emitters is in a second position different from the first position;
  - a plurality of receivers mounted to the support structure component and arranged along a second edge of the flexible display component to detect light, wherein when the flexible display component is in the first state, the plurality of receivers are in a third position, and when the flexible display component is in the second state, at least one of the plurality of receivers is in a fourth position different from the third position; and
  - a touch controller coupled to the plurality of emitters and the plurality of receivers, the touch controller configured to:
    - cause one or more of the plurality of emitters to emit light,
    - receive, from the plurality of receivers, one or more signals indicative of detected light at the plurality of receivers, and
    - determine at least one of a user interaction with the flexible display component or a current state of flexing of the flexible display component based on the one or more signals indicative of light detected at the plurality of receivers.

15. The flexible electronics assembly of claim 14, wherein the touch controller of the touch interface is configured to determine at least one of a tap, drag, swipe, fling, pinch, or squeeze gesture for interaction with images displayed on the flexible display component.

16. The flexible electronics assembly of claim 14, wherein at least some of the plurality of emitters are configured to emit light at a plurality of degrees with respect to the surface of the flexible display component.

17. The flexible electronics assembly of claim 14, wherein the plurality of emitters of the touch interface and the plurality of receivers of the touch interface are mounted to one or more bezels of the support structure component.

18. The flexible electronics assembly of claim 14, wherein the touch controller is configured to determine a global bending state of the flexible display component based on the one or more signals indicative of light detected at the plurality of receivers.

19. The flexible electronics assembly of claim 14, wherein the touch controller is configured to determine an overlap of a device in which the touch interface is integrated based on the one or more signals indicative of light detected at the plurality of receivers.

* * * * *